(12) United States Patent
Tahiliani et al.

(10) Patent No.: US 8,495,104 B2
(45) Date of Patent: Jul. 23, 2013

(54) DATABASE CHILD OBJECT WIZARD

(75) Inventors: Manoj Tahiliani, Mountain View, CA (US); Lalitha Gunasekaran, Santa Clara, CA (US); Lindy Chan, Elk Grove, CA (US); Cynthia Mee Yee Chan, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 931 days.

(21) Appl. No.: 12/253,810

(22) Filed: Oct. 17, 2008

(65) Prior Publication Data

US 2010/0114987 A1    May 6, 2010

(51) Int. Cl.
*G06F 17/30* (2006.01)
(52) U.S. Cl.
USPC .......................................... 707/805; 707/955
(58) Field of Classification Search
USPC ................................................ 707/805, 955
See application file for complete search history.

(56) References Cited

U.S. PATENT DOCUMENTS

| | | | | |
|---|---|---|---|---|
| 5,808,611 | A * | 9/1998 | Johnson et al. | 715/804 |
| 5,913,063 | A * | 6/1999 | McGurrin et al. | 717/109 |
| 6,192,365 | B1 * | 2/2001 | Draper et al. | 707/648 |
| 6,970,844 | B1 * | 11/2005 | Bierenbaum | 705/39 |
| 2003/0041313 | A1 * | 2/2003 | Harmon | 717/105 |
| 2004/0205711 | A1 * | 10/2004 | Ishimitsu et al. | 717/116 |
| 2006/0271390 | A1 * | 11/2006 | Rich et al. | 705/1 |
| 2008/0288918 | A1 * | 11/2008 | Knura et al. | 717/106 |

* cited by examiner

*Primary Examiner* — James E Richardson
(74) *Attorney, Agent, or Firm* — Kilpatrick Townsend & Stockton LLP

(57) ABSTRACT

Embodiments presented herein provide systems and methods for creating child objects for a database. A child object wizard provides one or more user interfaces that allow a database administrator to select or create a child object. One or more other interfaces allow the administrator generate object attributes. The user interfaces allow the database administrator to follow a simpler process to create a child object. The process saves time and money for the database administrator.

16 Claims, 19 Drawing Sheets

DATABASE CHILD OBJECT WIZARD

COPYRIGHT NOTICE

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

BACKGROUND

Today, many organizations manage large amounts of data. For example, companies may have data about the customers for which the company sells goods or services. This customer information can help the company provide further services or sell additional goods. In general, the data is stored in a database. Companies sometime desire to make use or develop the data in the database. To develop the data, the companies generally create or modify software components or software constructs that store the data.

Creating new database components is often very difficult. A database administrator or other experienced technician generates a basic database component. Then, the administrator must change the software code of the database component to create or modify the attributes or characteristics of the database components. This process of creating database components can be very complex, time consuming, and fraught with errors.

It is in light of these and other considerations that the present application is being presented.

BRIEF SUMMARY

Embodiments presented herein provide systems and methods for creating child objects for a database. A child object wizard provides one or more user interfaces that allow an administrator to select or create a child object. One or more other interfaces allow the administrator to generate object attributes. The user interfaces allow the administrator to follow a simpler process to create a child object. The process saves time and money for the administrator.

This Summary is offered to provide a simplified description of one or more embodiments. This Summary is not meant to limit the scope of the embodiments. Rather, the possible embodiments are as defined by the claims attached herein.

BRIEF DESCRIPTION OF THE DRAWINGS

Various embodiments in accordance with the present disclosure will be described with reference to the drawings, in which.

DETAILED DESCRIPTION

Figure 1:
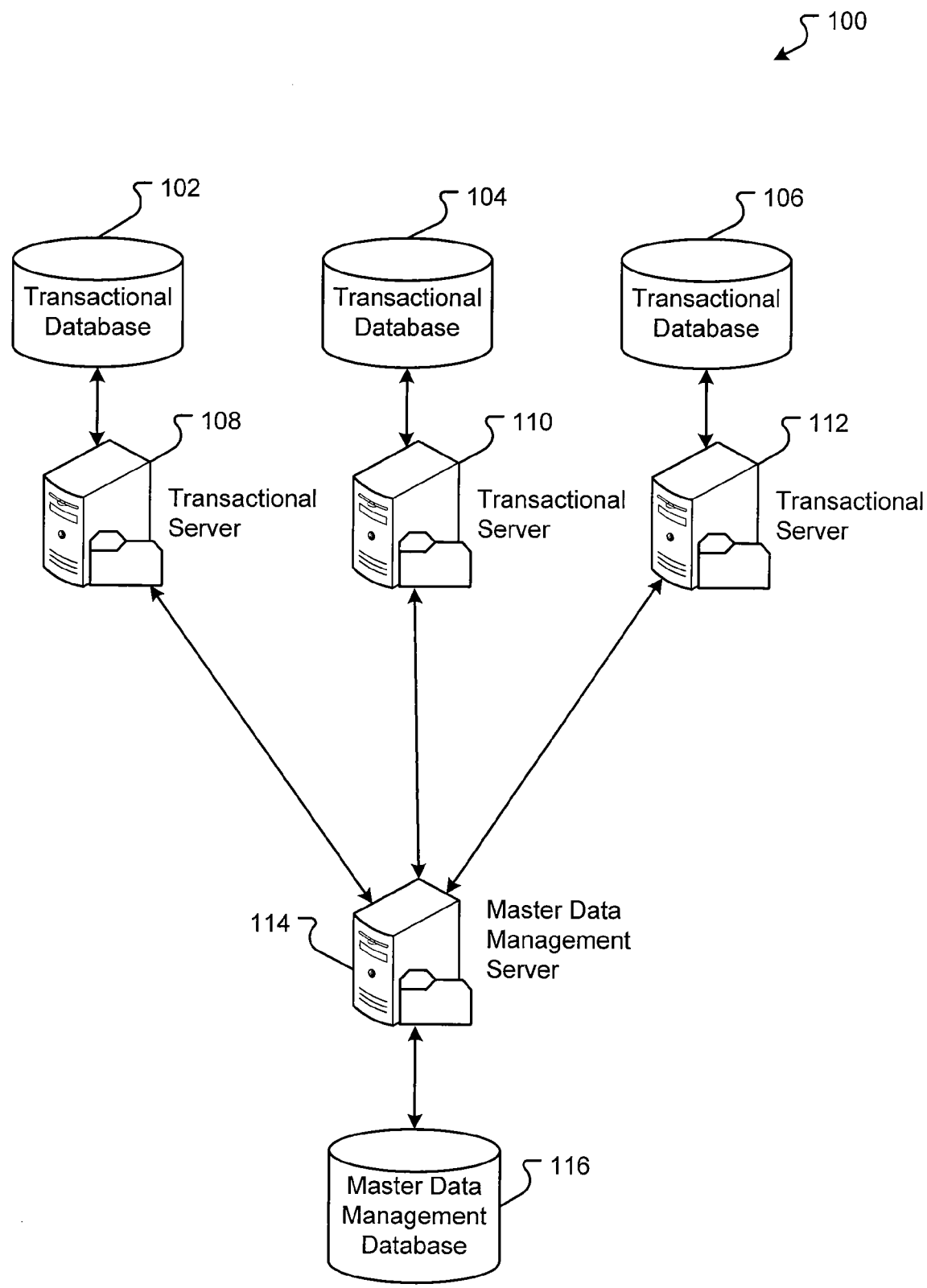
FIG. 1 is a block diagram of an embodiment of a Master Data Management (MDM) database system.

Systems and methods in accordance with various embodiments overcome the aforementioned and other deficiencies in the processes and systems for creating child objects in a database. A database is a hierarchical structure of objects having at least one parent object and at least one child object. Not by way of limitation, an object can be a software construct that includes one or more attributes, one or more methods for completing one or more processes, and/or storing one or more items of data. A child object may inherit one or more attributes from a parent object and may include one or more items of data stored by the parent object. Various different methods or systems may be used to link the child object to the parent object. In other embodiments, the database may not be object-oriented but still have a hierarchical structure that allows the creation of children and parents.

The system provides one or more user interfaces to create a new child object. A user interface may be a window displayed to a database administrator that assists the database administrator in creating the child object. The database system provides a first user interface that allows the database administrator to provide inputs, for example, that the database administrator desires to create a new child object. A next user interface may allow the database administrator to select a previously-defined child object from a database of previously-defined child objects. A previously-defined child object can be a child object that was created previously having one or more defined attributes. In other embodiments, the database system allows the database administrator to create a new child object. In one or more other user interfaces, the database administrator can select from which parent object the child object will depend. One or more other user interfaces are then provided to allow the database administrator to define the attributes of the child object. An attribute can be any characteristic of the child object. For example, attributes may include the data to be stored by the child object, metadata about the child object, etc. After creation of the child object, the database can instantiate the child object when the database is used.

An example of the method described above may involve a telecommunications company, for example, Verizon®. The telecommunications company may sell various services, such as, wireless telephone service, home phone service, Internet access, etc. The telecommunications company can have a customer database that includes one or more items of data about the customers. Each business unit (e.g., wireless, home phone, Internet, etc.) may have their own customer database. The company may want to know what services are being provided or have been offered to each customer. For example, if the customer is a wireless customer, has the customer been offered Internet service?

To provide this information, the telecommunications company can create a child object in the customer database to store and provide this information. A database administrator can create the child object using one or more user interfaces of the telecommunications company's database system. The database administrator defines attributes with the user interfaces. The attributes define that the child object shall store information about what services are being offered and what services have been offered for sale. Further, the database administrator can define that the child object depends from or is related to one or more parent objects in the telecommunications company database. For example, the child object depends from a parent object in the wireless business unit's database, in the Internet business unit's database, and/or in the home business unit's database. After creating the object, the telecommunications company can access this new information for different purposes, for example, cross-selling services to existing customers.

A block diagram of a database system 100 that provides a child object wizard is shown in FIG. 1. The database system 100 can include one or more transactional databases 102, 104, and/or 106. The transactional database 102, 104, and/or 106 is a database storing information for database users. The transactional database 102, 104, or 106 can include any type of data stored in any type of storage configuration (e.g., hierarchical file, flat file, etc.) on a storage medium, as explained in conjunction with FIGS. 15 and 16. Each transactional database 102, 104, or 106 may be associated with a certain type of data. For example, each transactional database 102, 104, or 106 is associated with a business unit (e.g., the wireless service business unit, the home phone service business unit, etc.). Embodiments of the transactional database 102, 104, or 106 stores one or more items of data and can provide the data to a transactional server 108, 110, or 112.

Figure 15:
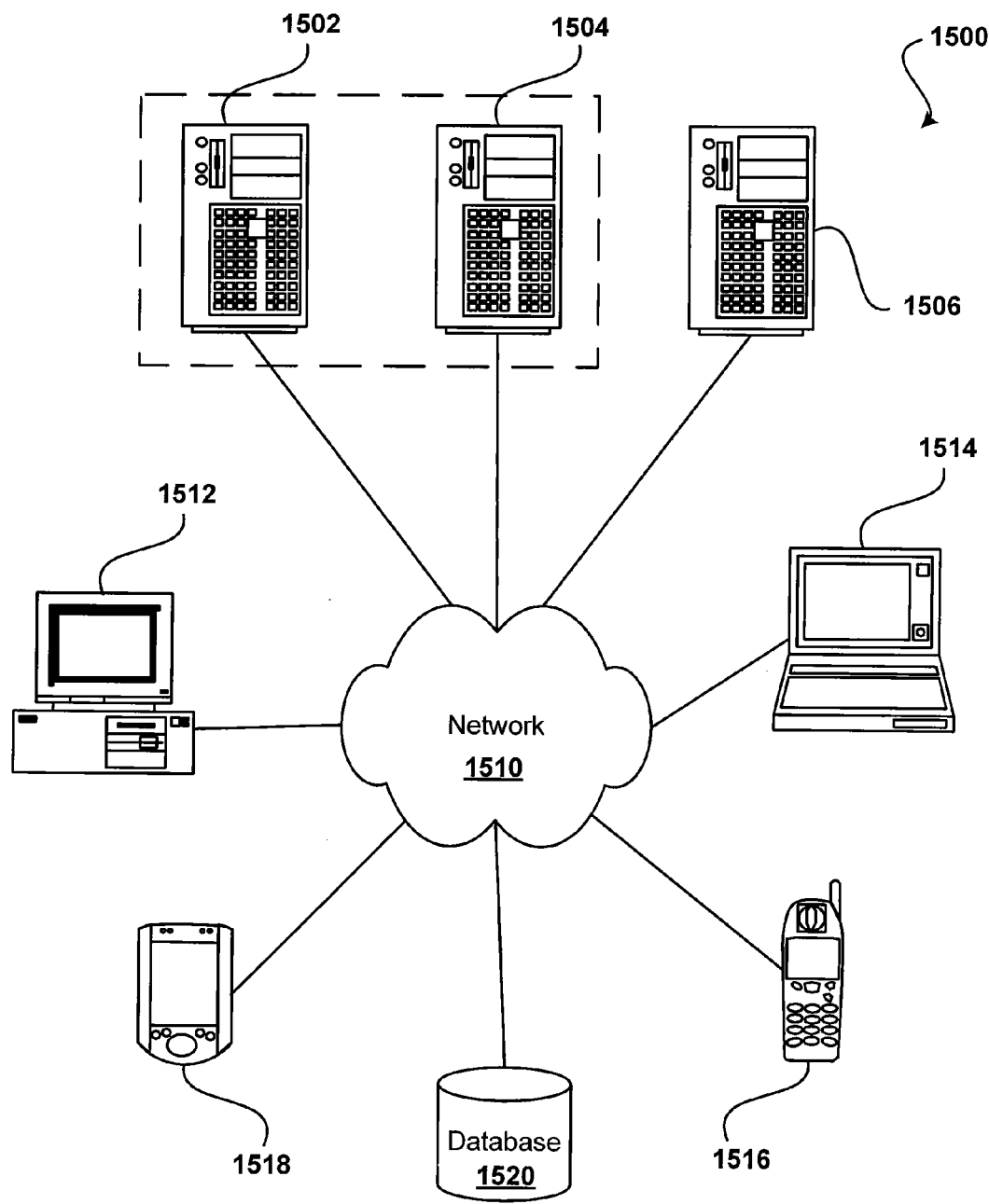
FIG. 15 is a block diagram of an embodiment of a networked computing environment operable to function as a database system.
Figure 16:
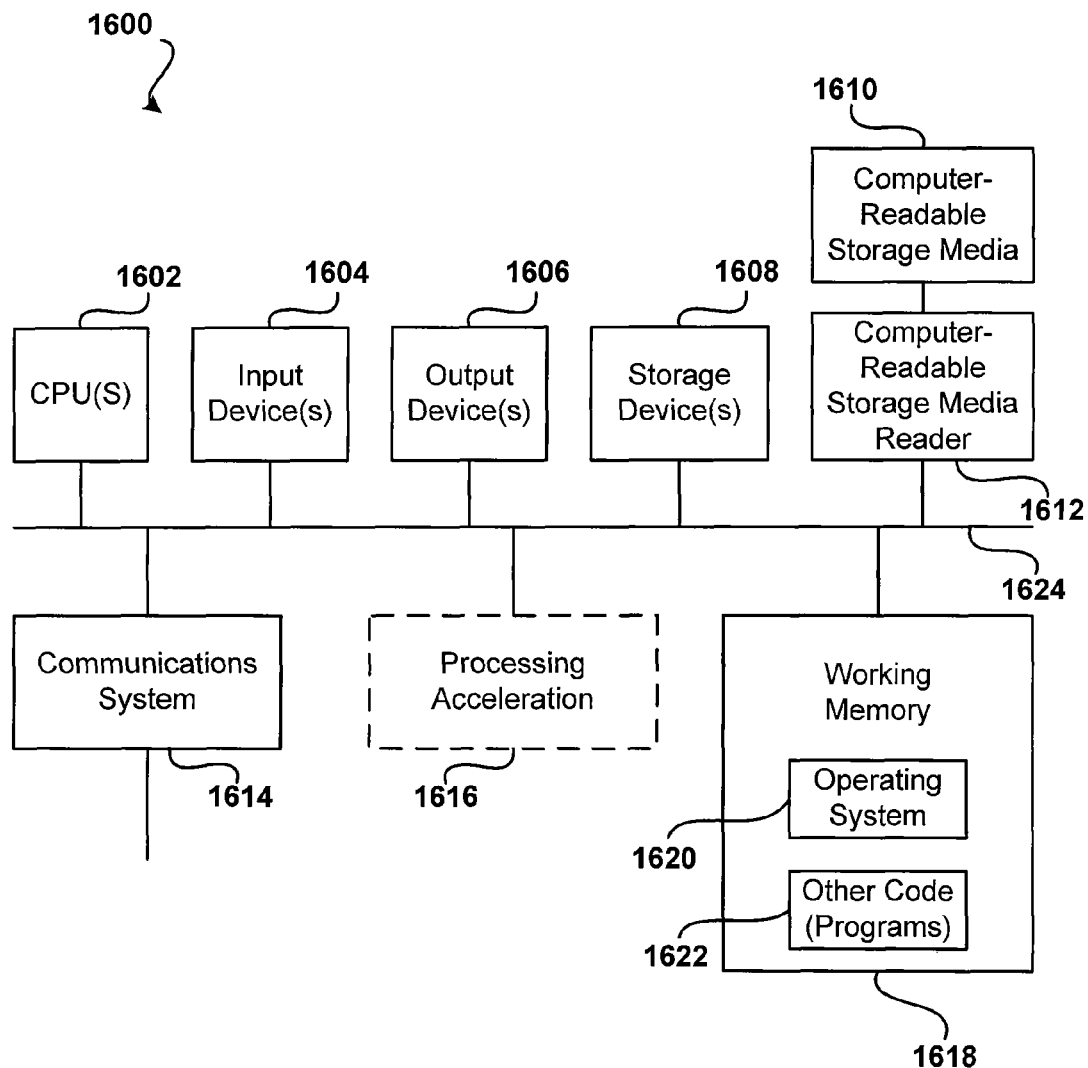
FIG. 16 is a block diagram of an embodiment of computer or computing system operable to function as one or more components in the database system.

The transactional server 108, 110, or 112 is a computing system, as explained in conjunction with FIGS. 15 and 16. The transactional server 108, 110, or 112 may run a database software application that allows a user to access the data in the transactional database 102, 104, or 106. The database application creates a data object hierarchy, as explained in conjunction with FIG. 2A. The data object hierarchy can retrieve one or more items of data from a data file, as explained in conjunction with FIG. 2B. The transactional server 108, 110, or 112 provides the user with the ability to change data, add data, delete data, query data, and complete various other database functions. The items of data are stored in the transactional database 102, 104, or 106 by the transactional server 108, 110, or 112.

The one or more transactional servers 108, 110, or 112 are in communication with a Master Data Management (MDM) server 114. The MDM server 114 is a computing system, as explained in conjunction with FIGS. 15 and 16. The MDM server 114, similar to the transactional server 108, 110, or 112, may run a database software application. However, unlike the transactional server 108, 110, or 112, the MDM server 114 can provide access to organizational-wide data. In other words, the MDM server 114 can include all the data stored at the separate transactional servers 108, 110, or 112. The MDM server 114 links to each transactional server 108, 110, or 112 to retrieve the transactional data from the transactional server 108, 110, or 112 and store the data into a MDM database 116. This structure allows separate business units to manage smaller more focused databases and includes one MDM server 114 that manages data across the entire organization.

Figure 2A:
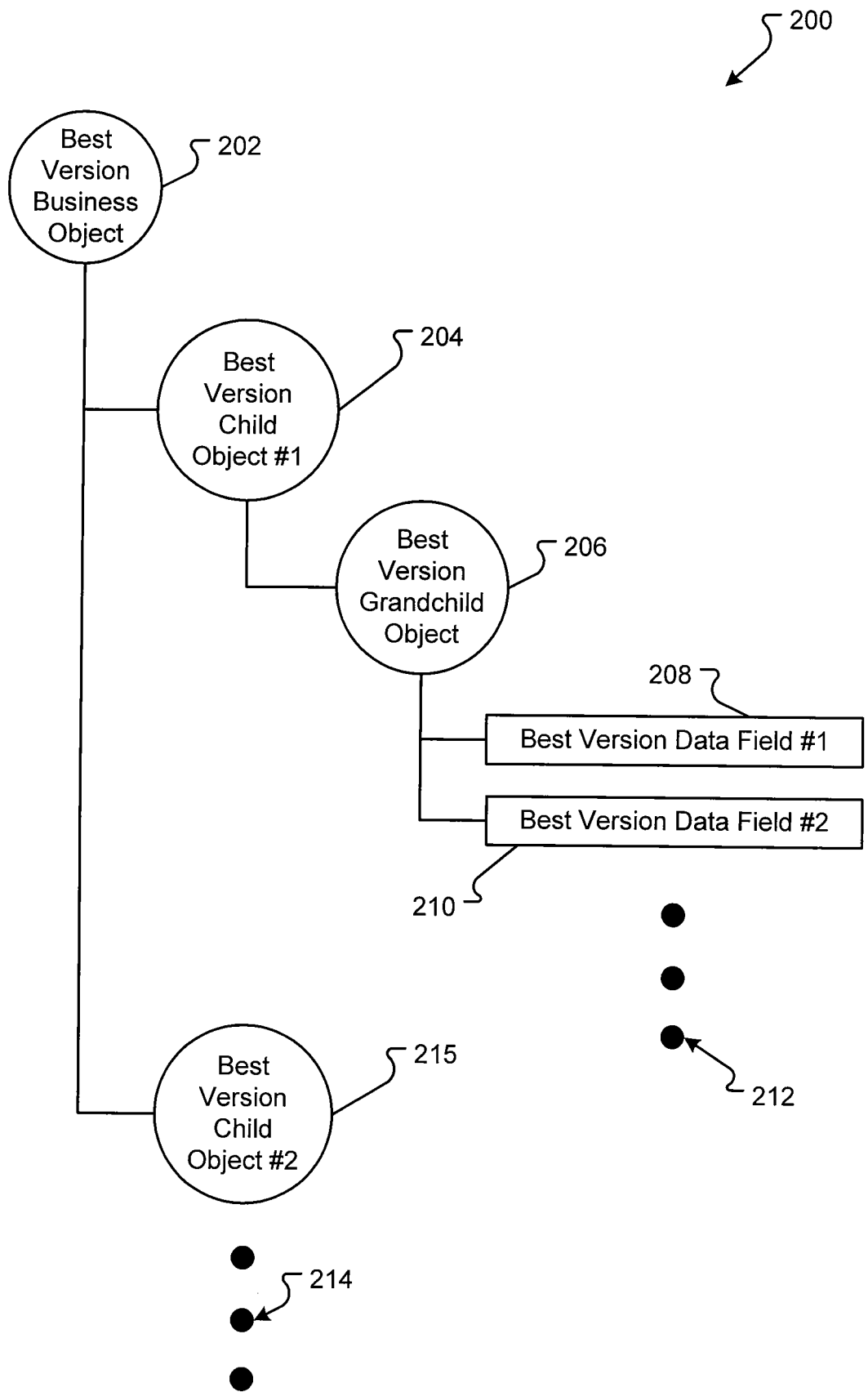
FIG. 2A is a block diagram of an embodiment of a best version database object model.

The database application executed by the MDM server 114 creates a data object hierarchy, as explained in conjunction with FIG. 2A. The data object hierarchy can retrieve one or more items of data from a data file, as explained in conjunction with FIG. 2B. The MDM server 114 can provide the user with the ability to change data, add data, delete data, query data, and complete various other database functions against company-wide data. Any action performed by a transactional server 108, 110, or 112 can be mirrored by the MDM server 114 and any action performed by the MDM server 114 can be mirrored by the transactional server 108, 110, or 112. In other words, if a change to data is made at the transactional server 108, 110, or 112, the MDM server 114 receives notice of the change and applies the change to the same data stored at the MDM server 114. This process also works in reverse if a change is made at the MDM server 114. The items of data are stored in the MDM database 116 by the MDM server 114.

The MDM database 116 is a database storing organizational-wide information for database users. The MDM database 116 can include any type of data stored in any type of storage configuration (e.g., hierarchical file, flat file, etc.) on a storage medium, as explained in conjunction with FIGS. 15 and 16. The MDM database 116 includes all the data stored in the transactional databases 102, 104, and/or 106.

The MDM database 116 can consist of one or more different layers and/or types of objects. For example, the database may consist of one or more data objects in a logic layer and one or more data files in a data layer. The objects in the logic layer provide the logic or methods that allow the database to function. The data layer provides files for storing records or instances of data. For example, one customer's data can be stored in a first data file while another customer's data can be stored in a second data file. The database may also consist of other objects and data, for example, data history objects and history data and integration objects and integration data. Data history objects and history data can include data and/or metadata associated about the data. In embodiments, integration objects and integration data are associated with linking the data in the MDM database 116 and the one or more transactional databases 102, 104, and/or 106

A block diagram of an object-oriented database 200 is shown in FIG. 2A. The object-oriented database 200 can be associated with an object layer. The object-oriented database 200 is similar to or the same as the transactional database 102, 104, or 106 (FIG. 1) and/or the MDM database 116 (FIG. 1). For explanation purposes, the object-oriented database 200 will be explained with reference to the MDM database 116 (FIG. 1), but one skilled in the art will recognize that much of the description will also apply to the transactional database 102, 104, or 106 (FIG. 1). Embodiments of the object-oriented database 200 include one or more database objects. Software objects, such as the database objects, are software constructs. The database objects shown in FIG. 2A are associated with the "best version" data in the database. In other words, the most recent configuration of the database object, including the most recent changes, are included in the "best version" database objects. The best version database objects are stored in the MDM database 116 (FIG. 1).

The object-oriented database 200 comprises at least one parent database object, referred to as the best version business object 202. The best version business object 202 can be the top level object in the hierarchical object-oriented database 200. This best version business object 202 can represent all the data in the MDM database 116 (FIG. 1) for the entire company. The best version business object 202 includes one or more children objects, for example, best version business child object #1 204 and best version business child object #2 215. Hereinafter, the description may focus on either the best version business child object #1 204 or the best version business child object #2 215. However, the description of the parent-child relationships and other description can apply, as one skilled in the art will recognize, to any child or parent object. The best version business object 202 may have more or fewer child objects than those shown in FIG. 2A, as represented by ellipses 214.

The best version business object 202 and the best version business child object #1 204 may be linked such that the best version business child object #1 204 inherits attributes or items of data from the best version business object 202. Further, executing actions on the best version business object 202 can include executing the same actions on all children or descendant objects. The best version business child object #1 204 can also have children objects. For example, best version business child object #1 204 has a child object, the best version business grandchild object 206. The best version business grandchild object 206 is the child of the best version business child object #1 204 and the grandchild of the best version business object 202. Any number of levels to the hierarchy of database objects are possible.

The best version business grandchild object 206 includes one or more best version business data fields, for example, best version data field #1 208 and/or best version data field #2 210. There may be more or fewer data fields than those shown in FIG. 2A, as represented by the ellipses 212. Each object, whether a parent or child object, can include one or more data fields. The data fields 208 and/or 210 represent the data retrieved for a data file and stored or held by the object. Embodiments of the data fields include data retrieved from a source data file, as explained in conjunction with FIG. 2B.

Figure 2B:
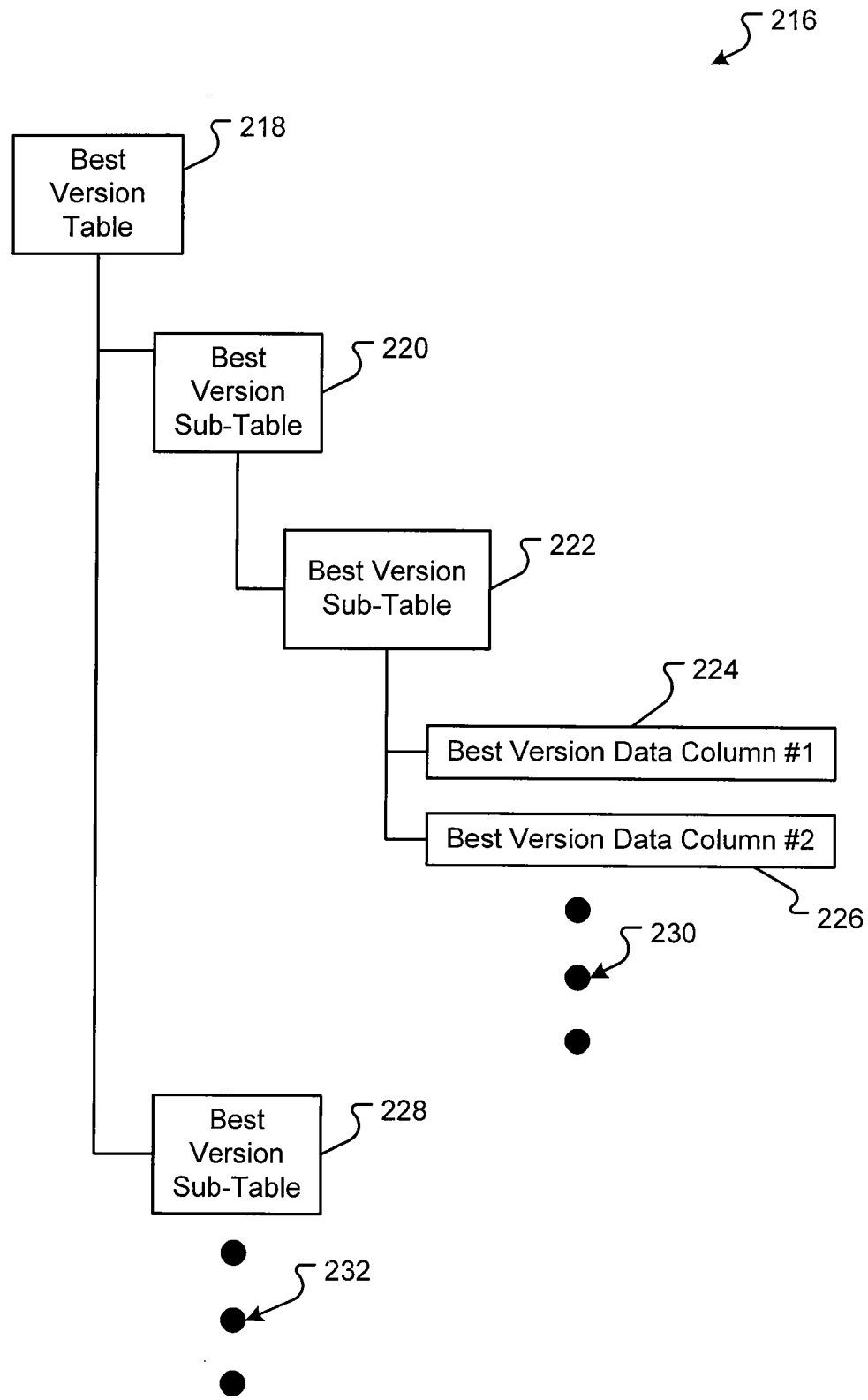
FIG. 2B is a block diagram of an embodiment of a best version database source data file model.

An embodiment of a source data file 216 is shown in FIG. 2B. In embodiments, one or more source data files 216 exist for the object-oriented database 200. Each source data file 216 can include different data. The source data file 216 also has a hierarchical structure. A best version table 218 includes the highest level data and can have one or more descendant data file structures, for example, best version subtable 220 and best version sub-table 228. The best version table 218 can have more or fewer descendant data file structures as represented by the ellipses 232. The best version subtable 220 can also have descendant data file structures, for example, the best version sub-table 222, the best version data column #1 224 and/or best version data column #2 226.

Each portion of the source data file 216 may be associated with an object in the object-oriented database 200. For example, best version table 218 with the best version business object 202. Likewise, a best version sub-table 220 includes child data for best version business child object #1 204. A best version sub-table 222 may be associated with the best version business grandchild object 206. Data included in best version data field #1 208 can be stored in the best version data column #1 224, and best version data field #2 210 can be stored in best version data column #2 226.

In operation, a user can request to use the database. In response to the request, the object-oriented database 200 can be executed by instantiating one or more database objects. The object-oriented database 200 can instantiate the best version business object 202, best version business child object #1 204, the best version business grandchild object 206, and any other database objects. The database objects retrieve one or more items of data from the source data file 216 associated with the user request. The database objects store the data from the best version data column #1 224 into the best version data field #1 208. One or more items of data may be retrieved and stored into a data field. After the database objects are instantiated and the database objects retrieve the data from the source data file, the user can complete one or more operations on the database by having the database objects perform methods on the object data.

Figure 3A:
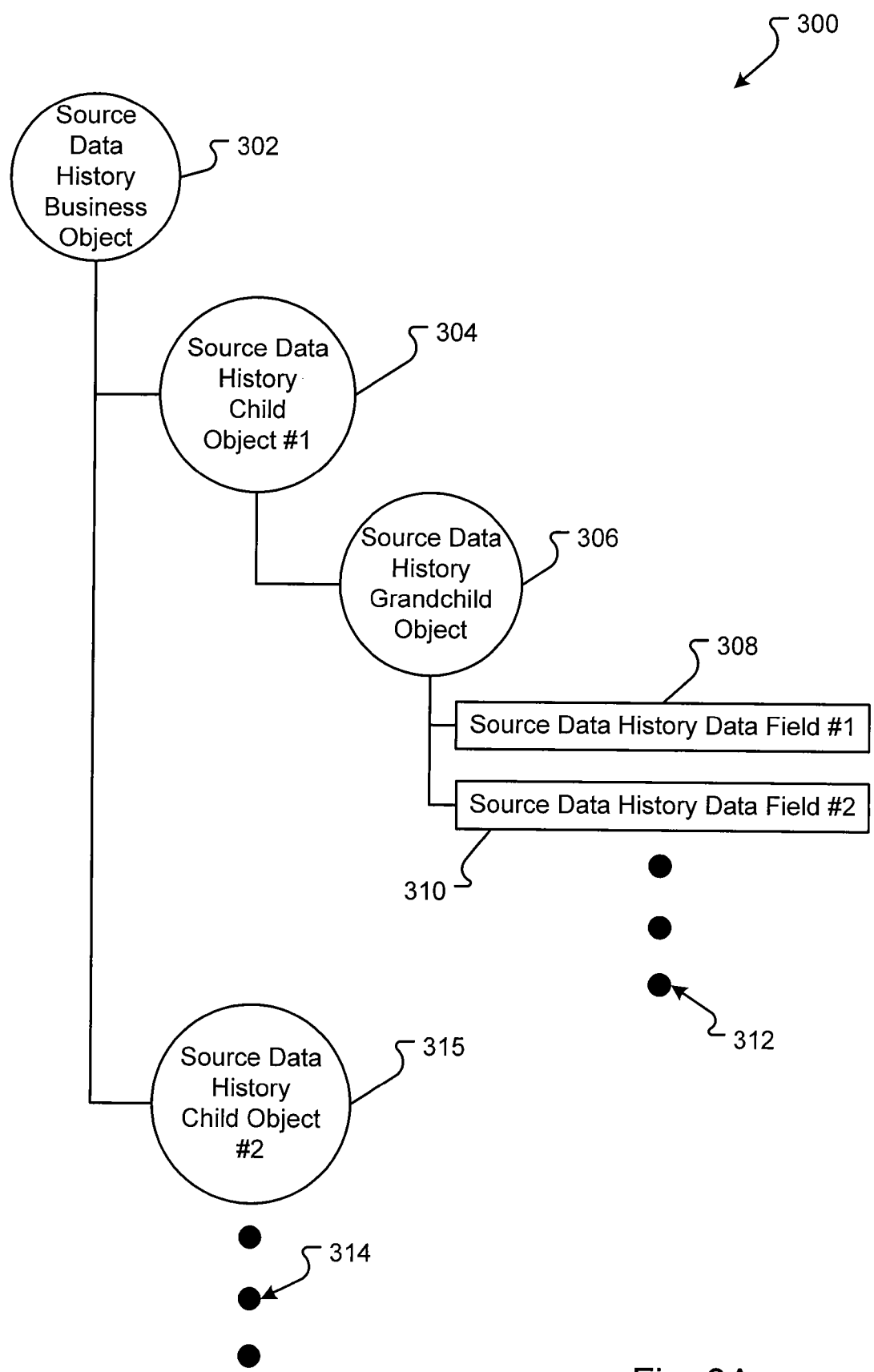
FIG. 3A is a block diagram of an embodiment of a source data history database object model.

An embodiment of a source data history database 300 is shown in FIG. 3A. The source data history database 300 includes data about the data in the object-oriented database 200 (FIG. 2A). For example, the source data history database 300 includes data about when the data object was created, when the data was stored, a history of modifications to the data, a time stamp for the data storage, etc. In embodiments, one or more source data history databases 300 exist for the object-oriented database 200 (FIG. 2A). Each source data history database 300 can include different source data history for each type of data in the object-oriented database 200 (FIG. 2A). The source data history database 300 also has a hierarchical structure. A source data history business object 302 is the highest level object and can have one or more descendant source data history objects, for example, source data history child object #1 304 and source data history child object #2 315. The source data history business object 302 can have more or fewer descendant data file structures as represented by the ellipses 314. The source data history child object #1 304 can also have descendant objects, for example, the source data history grandchild object 306, the source data history data field #1 308 and/or source data history data field #1 310. There may be more or fewer source data history data fields than those shown in FIG. 3A, as represented by the ellipses 312.

Each portion of the source data history database 300 may be associated with an object in the object-oriented database 200 (FIG. 2A). For example, source data history business object 302 is associated with the best version business object 202 (FIG. 2A). Likewise, a source data history child object #1 304 includes source data history data for best version business child object #1 204 (FIG. 2A). A source data history grandchild object 306 may be associated with the best version business grandchild object 206 (FIG. 2A). Data included in source data history data field #1 308 can include source data history data about data stored in the best version data column #1 224 (FIG. 2A).

Figure 3B:
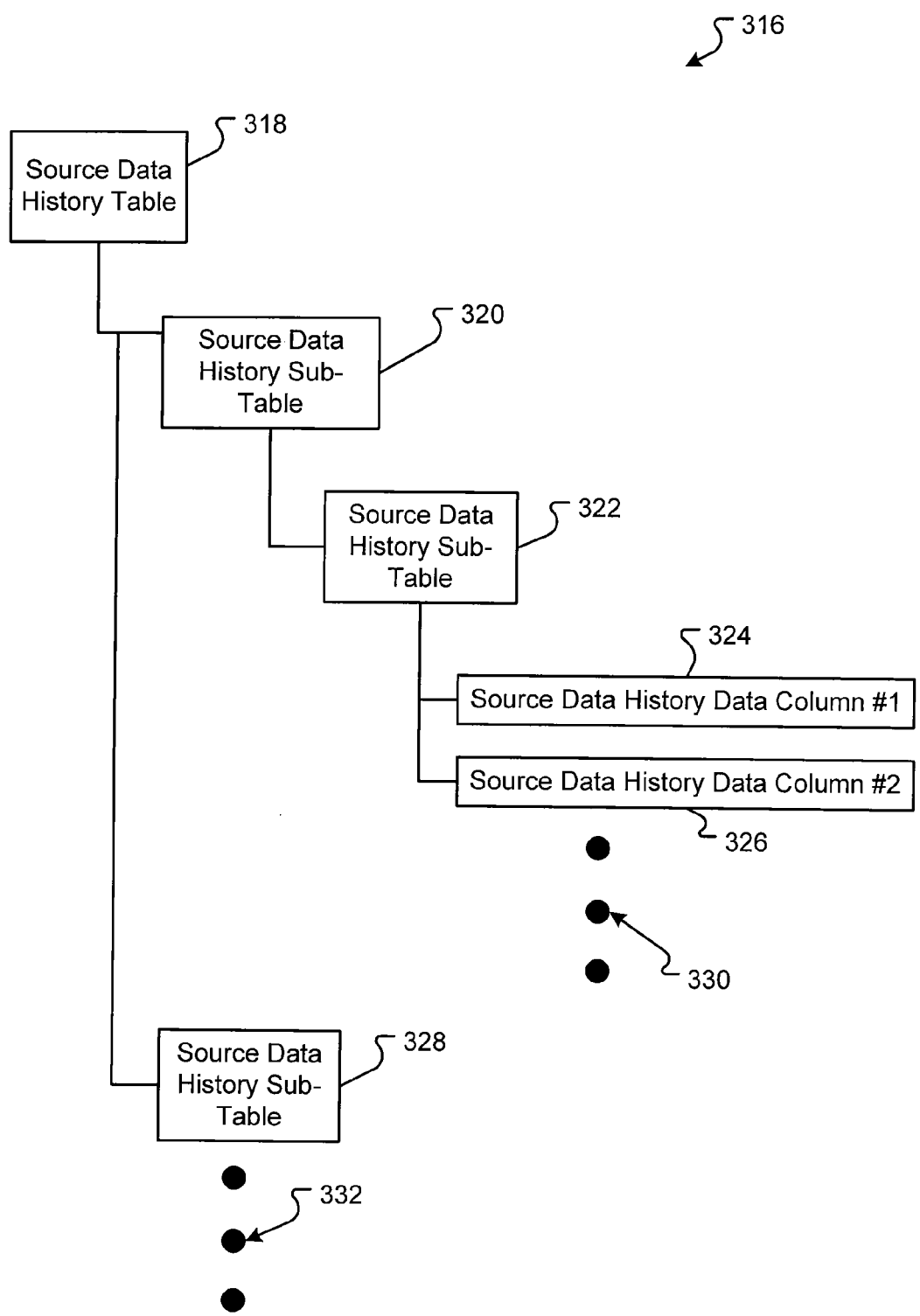
FIG. 3B is a block diagram of an embodiment of a source data history database source data file model.

An embodiment of a source data history data file 316 is shown in FIG. 3B. In embodiments, one or more source data history data files 316 exist for the source data history database 300. Each source data history data file 316 can include different data. The source data history data file 316 also has a hierarchical structure. A source data history table 318 includes the highest level data and can have one or more descendant data file structures, for example, source data history sub-table 320 and source data history sub-table 328. The source data history table 318 can have more or fewer descendant data file structures, as represented by the ellipses 332. The source data history sub-table 320 can also have descendant data file structures, for example, the source data history sub-table 322, the source data history data column #1 324 and/or source data history data column #2 326.

Each portion of the source data history data file 316 may be associated with an object in the source data history database 300. For example, source data history table 318 can be associated with the source data history business object 202 (FIG. 2A). Likewise, a source data history sub-table 320 includes child data for source data history business child object #1 304. A source data history sub-table 322 may be associated with the source data history business grandchild object 306. Data included in source data history data field #1 308 can be stored in the source data history data column #1 324, and source data history data field #2 310 can be stored in source data history data column #2 326. There may be more or fewer source data history data fields than those shown in FIG. 3B, as represented by the ellipses 330.

Figure 4:
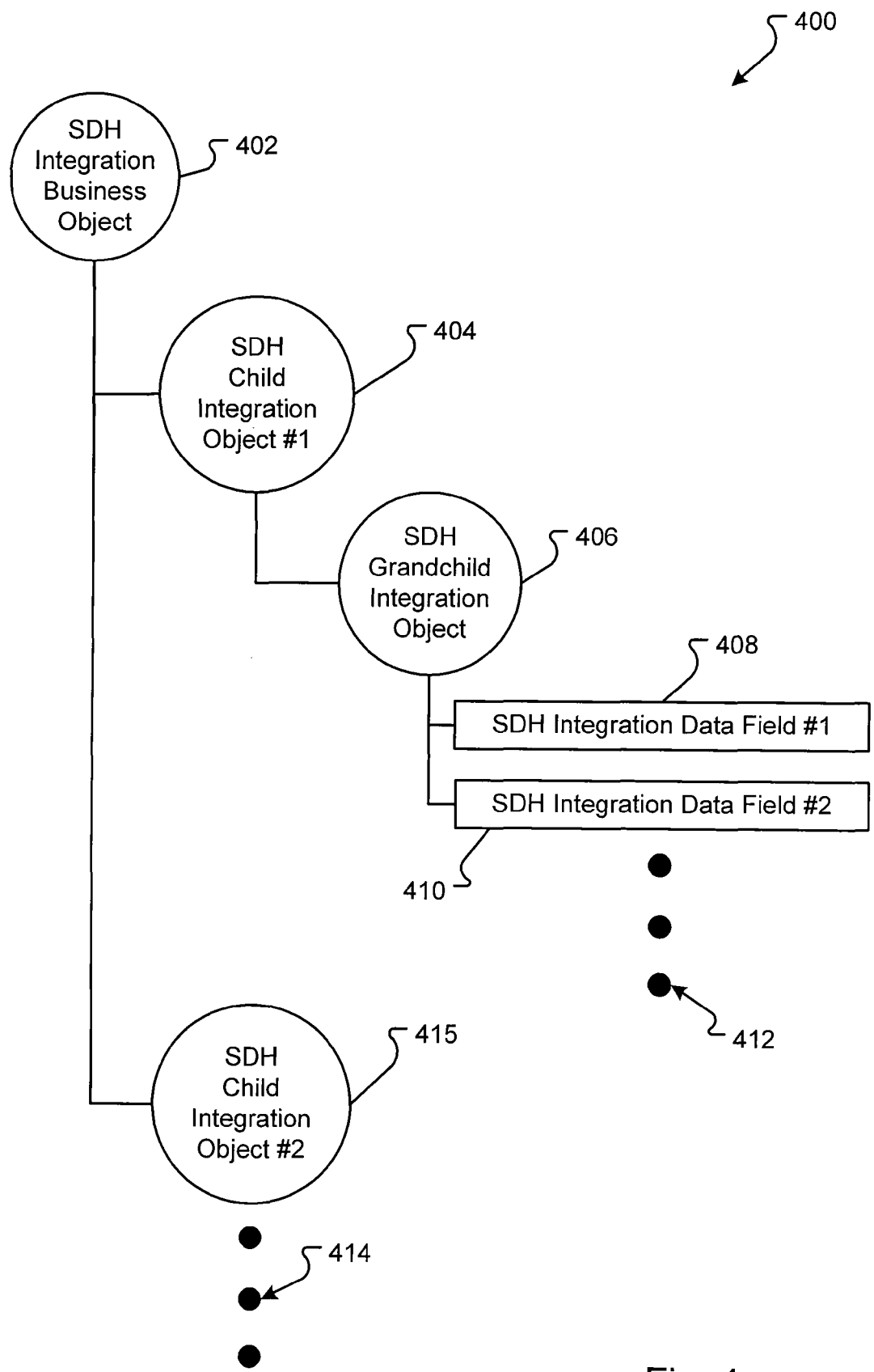
FIG. 4 is a block diagram of an embodiment of a source data history integration database object model.

An embodiment of a source data history (SDH) integration database 400 is shown in FIG. 4. The SDH integration database 400 includes objects that allow the MDM database 116 (FIG. 1) to exchange data with one or more transactional databases 102, 104, and/or 106 (FIG. 1). For example, the SDH integration database 400 provides methods for determining a change to the MDM database 116 (FIG. 1) or the one or more transactional databases 102, 104, and/or 106 (FIG. 1). In further embodiments, the SDH integration database 400 includes methods for transferring the changes from the MDM database 116 (FIG. 1) to the one or more transactional databases 102, 104, and/or 106 (FIG. 1) or from the one or more transactional databases 102, 104, and/or 106 (FIG. 1) to the MDM database 116 (FIG. 1). A SDH integration databases 400 exists for the object-oriented database 200 (FIG. 2). The SDH integration database 400 also has a hierarchical structure. A SDH integration business object 402 is the highest level object and can have one or more descendant SDH integration objects, for example, SDH integration child object #1 404 and SDH integration child object #2 415. The SDH integration business object 402 can have more or fewer descendant data file structures as represented by the ellipses 414. The SDH integration child object #1 404 can also have descendant objects, for example, the SDH integration grandchild object 406, the SDH integration data field #1 408, and/or SDH integration data field #2 410. There may be more or fewer SDH integration data fields than those shown in FIG. 4, as represented by the ellipses 412.

Each portion of the SDH integration database 400 may be associated with an object in the object-oriented database 200 (FIG. 2). For example, SDH integration business object 402 is associated with the best version business object 202 (FIG. 2). Likewise, a SDH integration child object #1 404 includes SDH integration data for best version business child object #1 204 (FIG. 2). A SDH integration grandchild object 406 may be associated with the best version business grandchild object 206 (FIG. 2). Data included in SDH integration data field #1 408 can include SDH integration data about data stored in the best version data column #1 224 (FIG. 2B).

Figure 5:
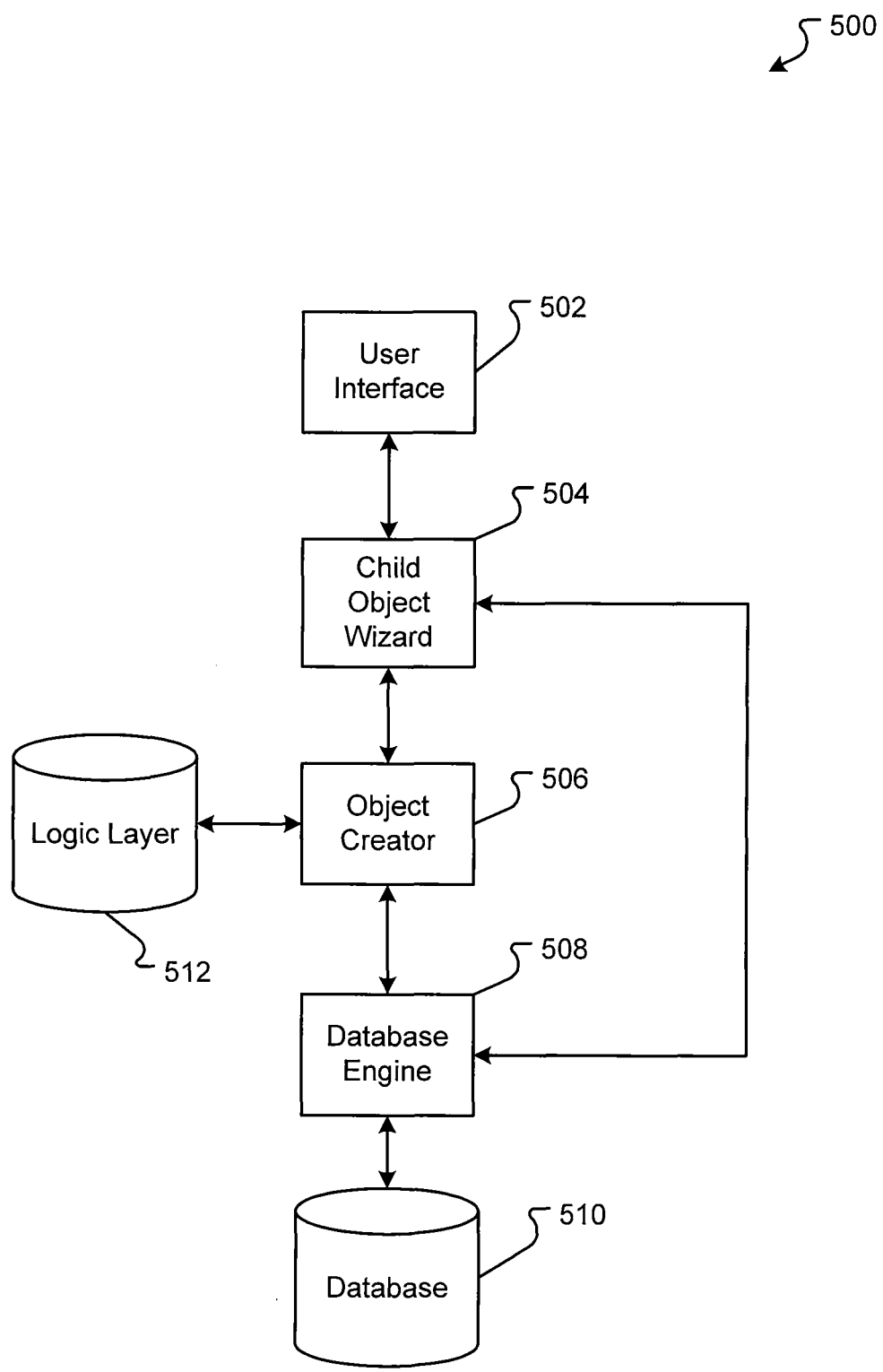
FIG. 5 is a block diagram of an embodiment of child wizard software system for creating a new child object.

An embodiment of a database system 500 is shown in FIG. 5. The database system 500 comprises one or more software components. However, in alternative embodiments, the database system 500 comprises hardware or hardware and software components. The database system 500 allows a database administrator to create a child object. The child object may be created in the MDM database 116 (FIG. 1), but, in other embodiments, the child object may be created in one of the transaction databases 102, 104, or 106 (FIG. 1).

The database system 500 comprises a child object wizard 504. The child wizard 504 provides one or more interfaces for the database administrator to create the child object. The user interfaces can include one or more windows rendered on a user interface 502 that is in communication with the child object wizard 504. The user interface 502 may be as explained in conjunction with FIGS. 15 and 16. The child object wizard 504 receives one or more inputs from the database administrator from the user interface 502. The child object wizard 504 provides the inputs to the object creator 506.

An object creator 506 is in communication with the child object wizard 504. The object creator 506 creates the software code for the child object and stores the child object in the logic layer 512. The object creator 506 can generate the one or more other associated objects, for example, the SDH objects or the SDH integration objects. The code for the objects can be created from the inputs from the child object wizard 504. The object creator 506 generates the source code for an object from a template. The template can be modified according to the inputs from the child object wizard 504. Further, the object creator 506 can associate the business object with the SDH object and the SDH integration object with pointers or other links.

A database engine 508 is in communication with the object creator 506 and/or the child object wizard 504. The database engine 508 receives inputs from the object creator 506 and/or the child object wizard 504 to generate the data files, as explained in conjunction with FIGS. 2B and 3B. The database engine 508 can generate the data files from templates and modify the templates according to the inputs from the object creator 506 and/or the child object wizard 504. The database engine 508 stores the data file in the database 510. The database engine 508 also retrieves data from the database 510 to populate objects that are instantiated from the logic layer 512.

One or more embodiments of user interfaces are shown in FIGS. 7-14. The user interfaces are provided to demonstrate how the child object wizard 504 can provide displays to and receive inputs from a database administrator. The one or more user interfaces 502 will be used to describe a method 600 for generating a child object shown in FIG. 6. Before explaining the method 600, some description of the user interface is required.

Figure 7:
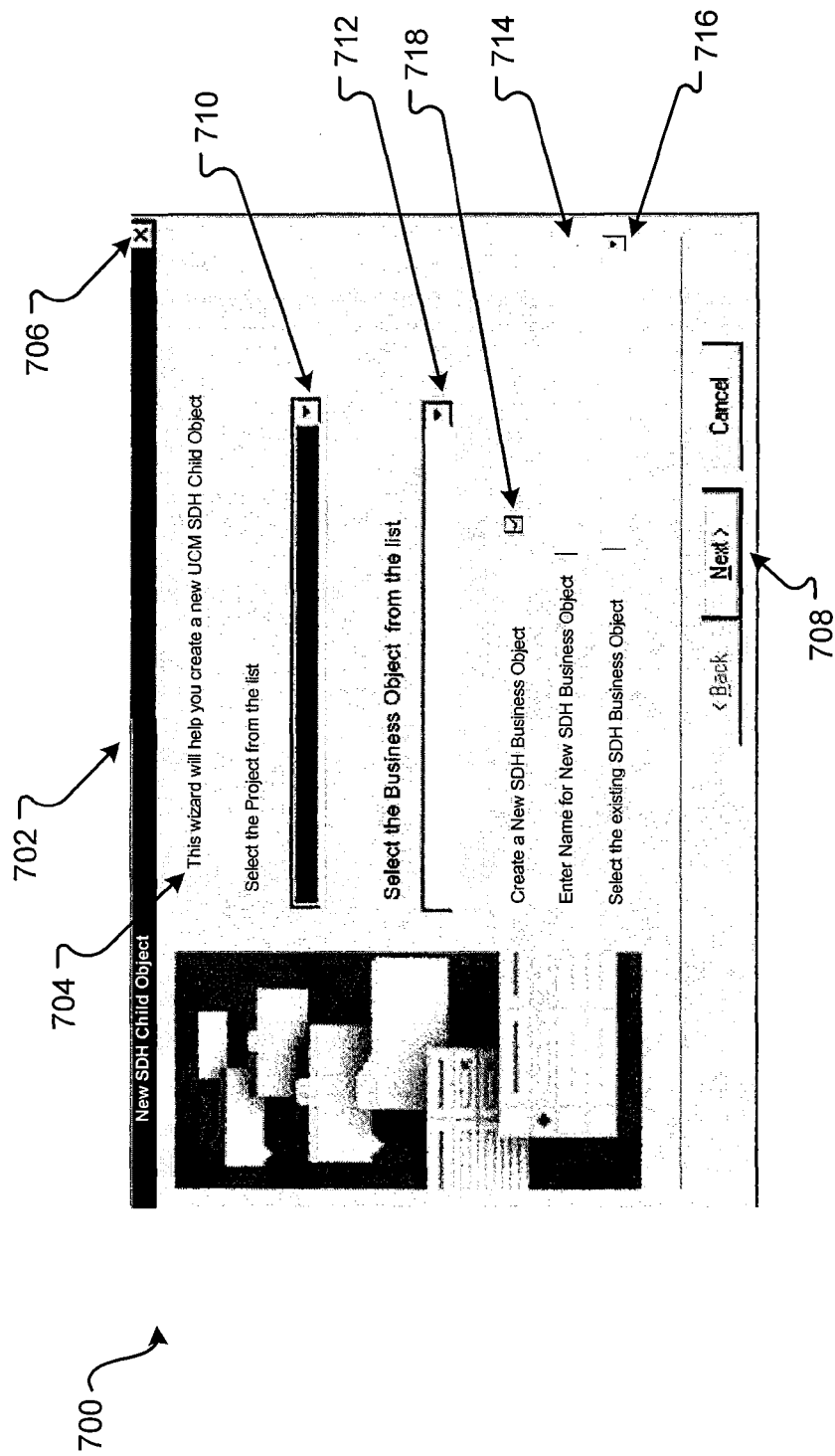
FIGS. 7-14 are embodiments of user interface displays for receiving selections from a user for creation of a new child object.
Figure 8:
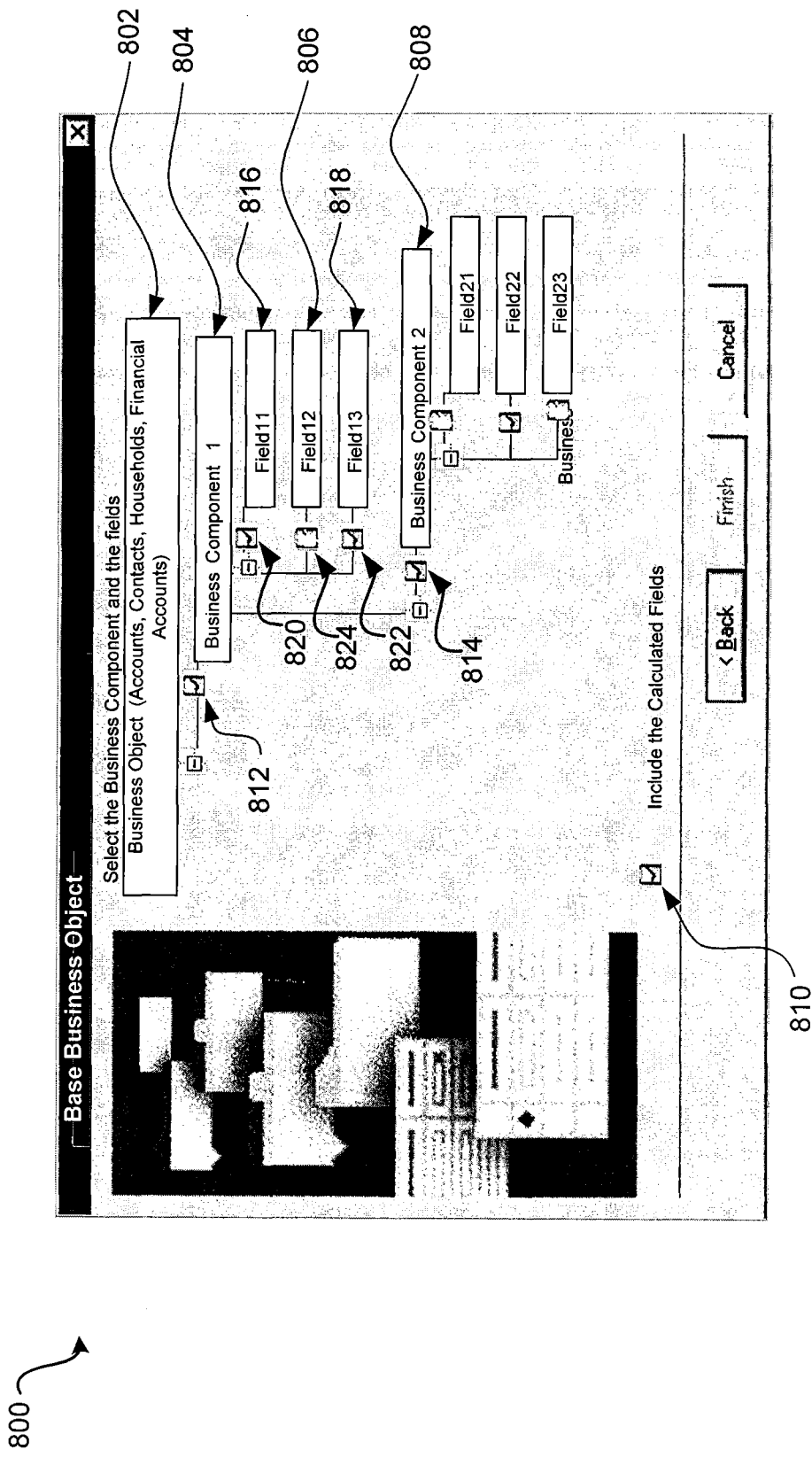

An example user interface 702 is shown in FIG. 7. The user interface 702 is a graphical user interface display called a window. The window 702 can be displayed on a user interface display as explained in conjunction with FIGS. 15 and 16. The window 702 can provide information and receive inputs from the user from one or more user interface devices. Window 702 provides information to users as a display. For example, statement 704 describes the function of the window 702 to the user.

The window 702 can receive inputs by receiving interaction between a cursor or other user controlled device that responds to movements by a mouse, keyboard, or other device. The user interface devices may include buttons, radio buttons, menus, drop down menus, input fields, etc. For example, a user can make a selection of a project from a drop down menu 710 by interacting with the menu 710 with a mouse-controlled cursor. The window 702 may also have one or more user interface devices to control the window, for example, button 706 that closes the window 702. The other user interfaces in FIGS. 8-14 may have similar or the same devices and functions. The preceding description may apply to the other user interfaces in FIGS. 8-14.

Figure 6:
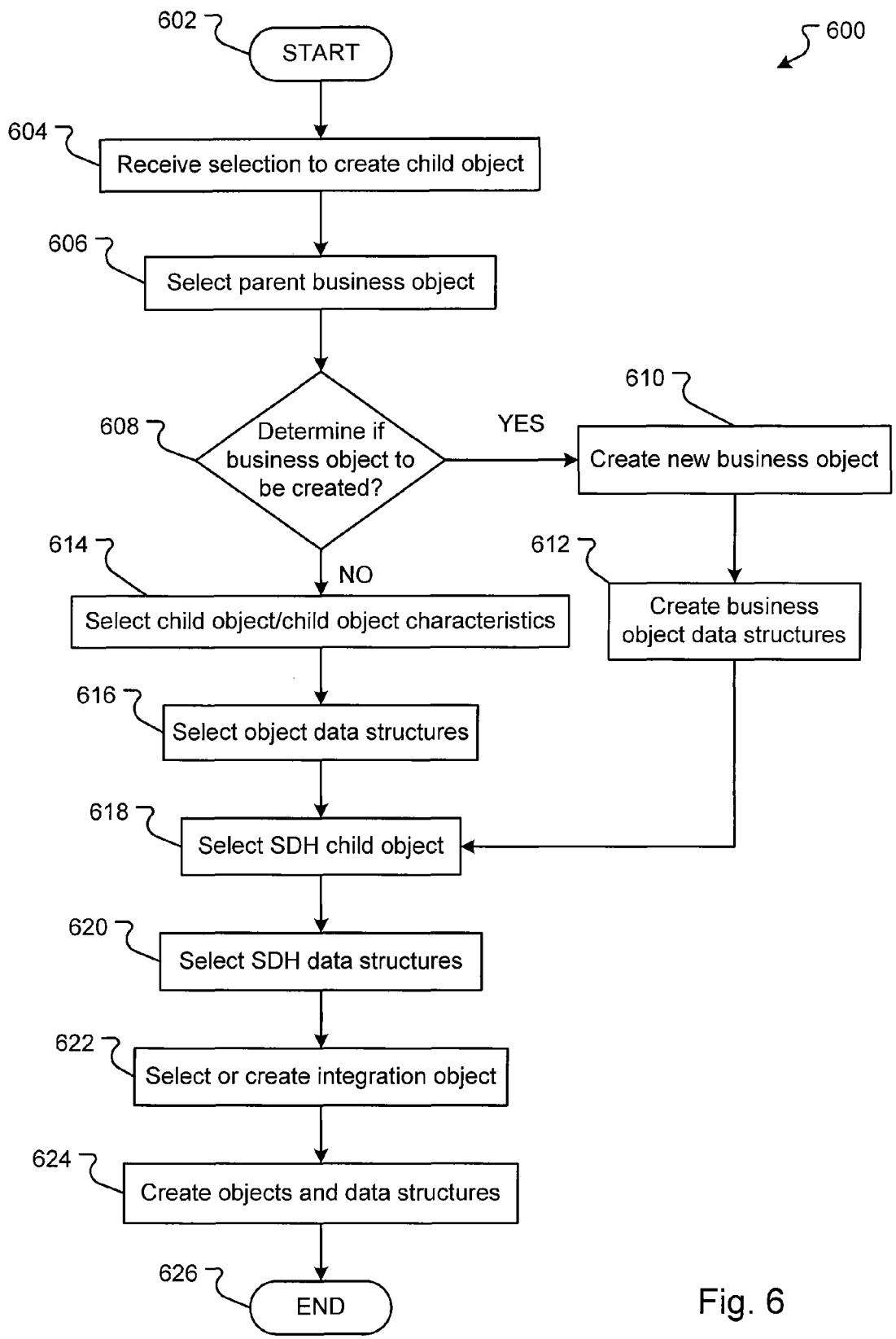
FIG. 6 is a flow diagram of an embodiment of a method for automatically creating a new child object.

An embodiment of a method 600 for interacting with a child object wizard 504 (FIG. 5) to generate automatically a child object is shown in FIG. 6. The method 600 generally begins with a START operation 602 and terminates with an END operation 626. The steps shown in the method 600 may be executed in a computer system as a set of computer executable instructions. While a logical order is shown in FIG. 6, the steps shown or described can, in some circumstances, be executed in a different order than presented herein. The method 600 will be explained in conjunction with the one or more user interfaces shown in FIGS. 7-14.

A database administrator selects a user interface device to create a child object, and the child object wizard 504 (FIG. 5) receives the selection (step 604). The child object may be a child object in the MDM database 116 (FIG. 1). For example, the database administrator may desire to create child object 215 (FIG. 2A) in the business object database 200 (FIG. 2A). The MDM server 114 (FIG. 1) can receive the selection to create the child object and start the child object wizard 504 (FIG. 5). The child object wizard 504 (FIG. 5) provides a user interface to the database administrator. For example, the child object wizard 504 (FIG. 5) provides user interface 702 (FIG. 7). The database administrator makes a selection of a project from a drop down menu 710 (FIG. 7). The project selected can be associated with a database represented by the object-oriented database 200 (FIG. 2A). For example, a database administrator can select a database for the wireless services database.

The database administrator may also select the parent business object from which the child object will depend (step 606). The database administrator provides the parent business object (e.g., best version business object 202 (FIG. 2)) from which to create the descendant child object. The database administrator may select the parent object from the drop down menu 712 (FIG. 7). For example, the database administrator can make a selection that the new child object 215 (FIG. 2A) will depend from parent business object 202 (FIG. 2A). The selection of the parent business object 202 (FIG. 2A) may be completed contemporaneously with the selection of the child object because both inputs may be given to the child object wizard 504 (FIG. 5) in user interface 702 (FIG. 7). The child object wizard 504 (FIG. 5) can receive the inputs from user interface 702 (FIG. 7) and provide one or more of the inputs to the object creator 506 (FIG. 5). The object creator 506 (FIG. 5) may store the inputs for later object creation or create a template or base object for later modification.

The child object wizard 504 (FIG. 5) receives the inputs from the user interface 702 (FIG. 7). The child object wizard 504 (FIG. 5) can then determine if the database administrator desires to create a new child object or modify a pre-existing child object. If the database administrator desires to create a new child object, the method 600 flows YES to create operation 610. If the database administrator does not desire to create a new child object, the method 600 flows NO to select operation 614.

The object creator 506 (FIG. 5) can determine if the business object is to be created (step 608). A database administrator can create a new business object without using a previously created business object or select pre-existing business object to modify and change into a new business object. The pre-existing object may be a business object that is created as part of the standard package of business objects in the MDM database 116 (FIG. 1). The standard business object may not be used currently in the business object database 200 (FIG. 2A) but can be created for subsequent use.

The user interface 702 (FIG. 7) receives a selection of a check box user interface device 718 (FIG. 7) if the database administrator desires to create the business object. In alternative embodiments, the user interface 702 (FIG. 7) receives a selection of a pre-existing business object from a drop down menu 716 (FIG. 7) if the database administrator does not desire to create the business object but desires to use the pre-existing business object. The user interface 702 (FIG. 7) may not allow selection in both the check box user interface device 718 (FIG. 7) and the drop down menu 712 (FIG. 7). In other embodiments, if the database administrator makes selections in both the check box user interface device 718 (FIG. 7) and the drop down menu 712 (FIG. 7), the child object wizard 504 (FIG. 5) displays an error to the database administrator. If the database administrator desires to create the child object, the database administrator can enter a new name for the child object in the text field 714 (FIG. 7). After the selections are made, the database administrator selects the "Next" button 708 (FIG. 7) to provide the inputs to the child object wizard 504 (FIG. 5).

The object creator 506 (FIG. 5) then creates an object (step 610). After receiving the selection for creating a new business object, the child object wizard 504 (FIG. 5) provides user interface 800, shown in FIG. 8, to the database administrator. The user interface 800 can display a base business object format generated from a standard template. The base business object can have one or more components or children objects and include one or more fields for storing data. The database administrator may enter which components or fields to include in the new business object. For example, the database administrator includes child business object entitled "business component 1" 804 by selecting check box 812 and includes child business object entitled "business component 2" 808 by selecting check box 814. Likewise, the database administrator includes the data field "Field11" 816 by selecting check box 820 and the data field "Field13" 818 by selecting check box 822. However, the database administrator has not selected check box 824, and thus, data field "Field12" 806 will not be included in the new child business object 802.

The child object wizard 504 (FIG. 5) can receive these inputs and pass the inputs to the object creator 506 (FIG. 5) to create the new child business object 215 (FIG. 2A). The child object wizard 504 (FIG. 5) also includes a check box 810 to allow the database administrator to choose to include calculated fields in the new child business object 215 (FIG. 2A). Calculated fields may be fields automatically generated for data created from associations between data in the included fields. One or more other fields or components may be automatically included in the new child business object 215 (FIG. 2A) by the child object wizard 504 (FIG. 5).

The object creator 506 (FIG. 5) creates the one or more business object data structures (step 612). Along with the object-oriented database 200 (FIG. 2A), the child object wizard 504 (FIG. 5) also creates the data file 216 (FIG. 2B). The inputs for the objects in user interface 800 can also provide the necessary information for the data file 216 (FIG. 2B). Further, any additional fields in the data file 216 (FIG. 2B) may be automatically generated by the child object wizard 504 (FIG. 5).

The object creator 506 (FIG. 5) may also select the pre-existing child object from which to create the child object in the database 200 (FIG. 2A) (step 614). A pre-existing object may be an object included in a standard database and then not included during the installation of the database 200 (FIG. 2A). For example, the user may install a Siebel database. The Siebel database may include several objects with the standard database. When the user wants to create a new business object, the database administrator can select one of the child objects in the Siebel database that was not previously used.

Figure 9:
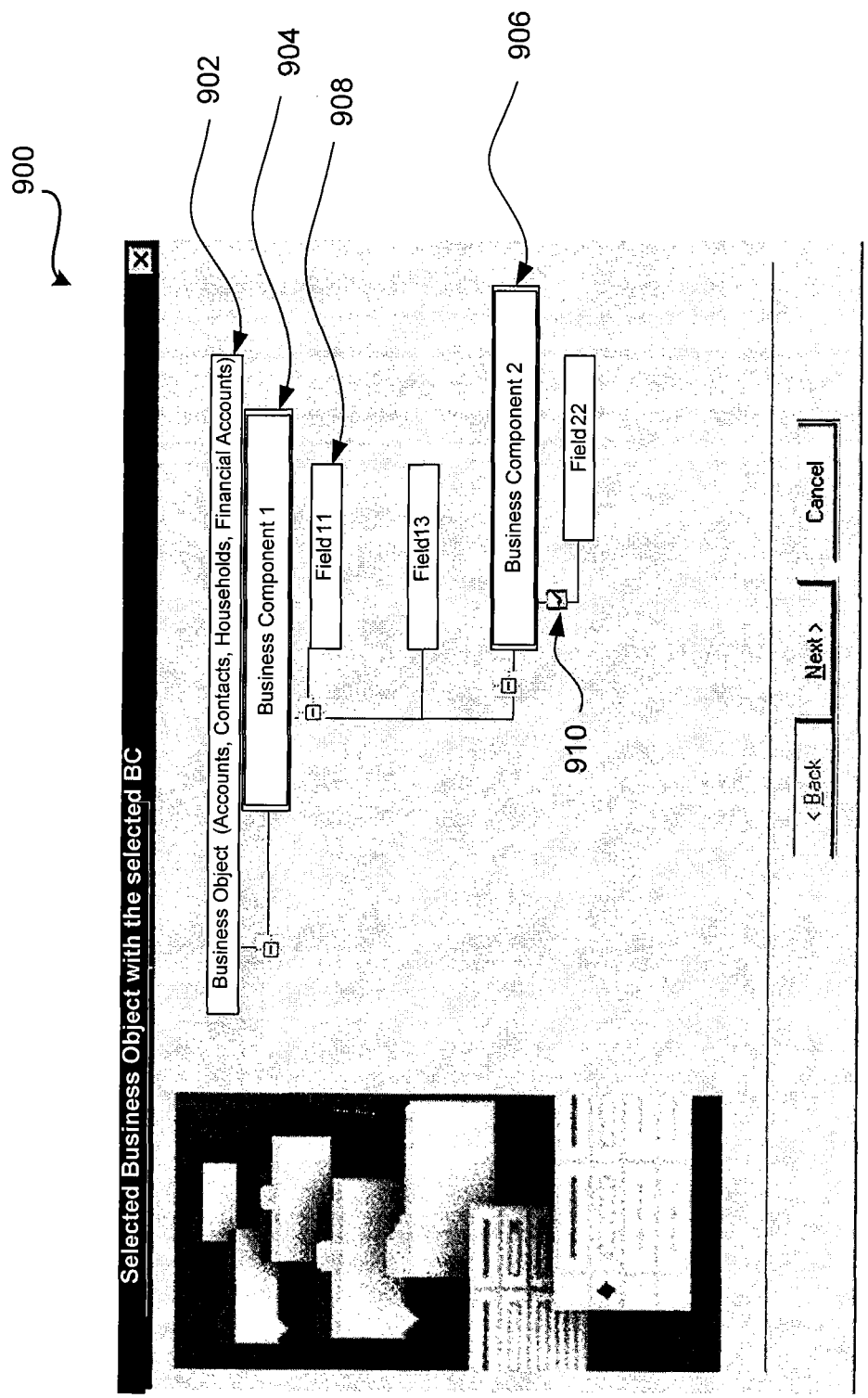
Figure 10:
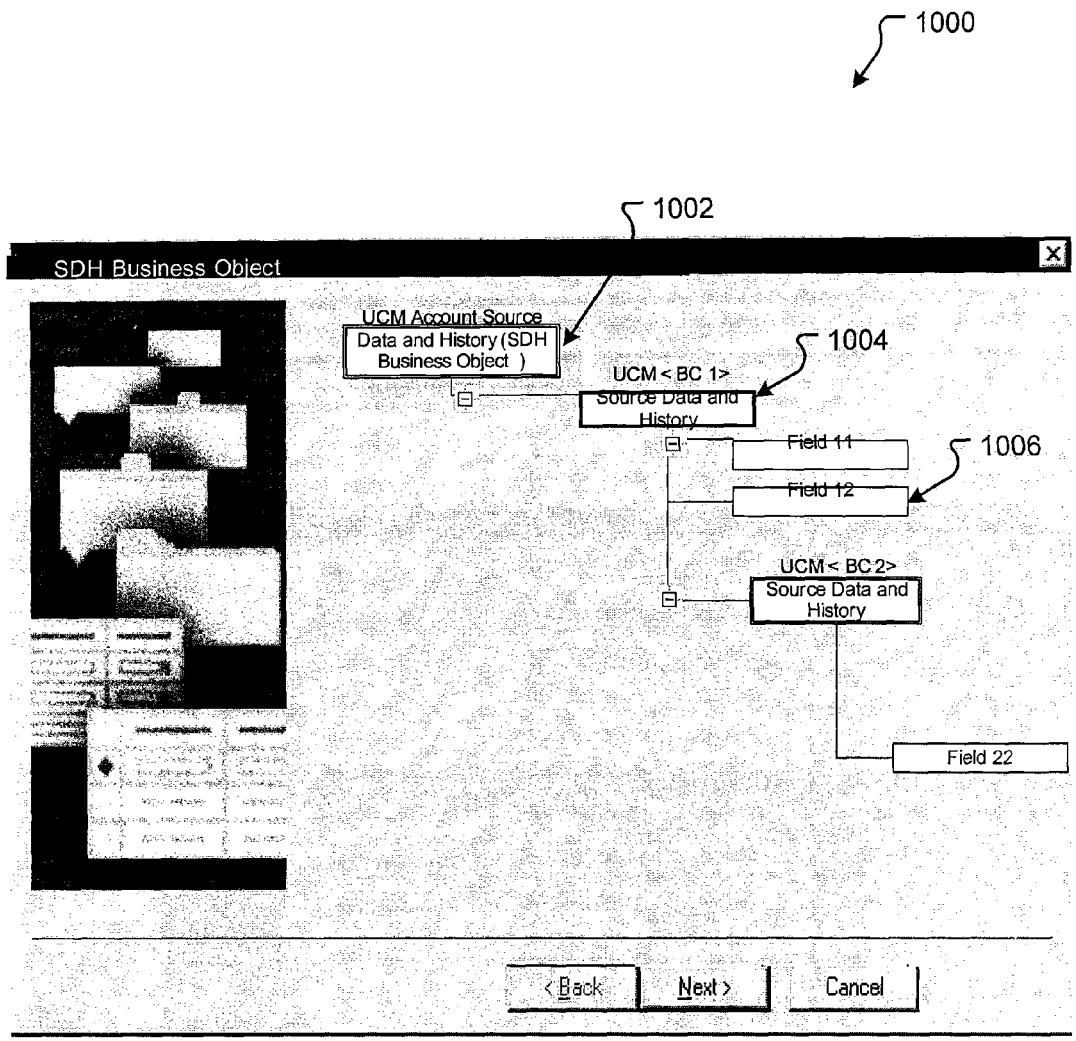

After receiving the selection for using a pre-existing business object or after creating a new child object, the child object wizard 504 (FIG. 5) provides user interface 900, shown in FIG. 9, to the database administrator. The user interface 900 can display the pre-existing child object format 902. The pre-existing child object 902 can have one or more components or children objects 904 and/or 906 and include one or more fields 908 for storing data. One or more of the components or fields may be automatically included with the pre-existing child object 902. However, some components or fields may be optional and chosen by selecting a check box, e.g., check box 910. Along with the object structure 200 (FIG. 2A) for the pre-existing child object 902, the child object wizard 504 (FIG. 5) may also retrieve the data file 216 (FIG. 2B) for the pre-existing child object 902. The inputs for the objects in user interface 900 can also provide the necessary information for the data file 216 (FIG. 2B). Further, any optional fields in the data file 216 (FIG. 2B) may be automatically generated by the child object wizard 504 (FIG. 5).

The child object wizard 504 (FIG. 5) selects the one or more object data structures (step 616). Along with the object structure 200 (FIG. 2A), the child object wizard 504 (FIG. 5) also creates the data file 216 (FIG. 2B). The inputs for the objects in user interface 900 (FIG. 9) can also provide the necessary information for the data file 216 (FIG. 2B). Further, any additional fields in the data file 216 (FIG. 2B) may be automatically generated by the child object wizard 504 (FIG. 5).

The child object wizard 504 (FIG. 5) selects the SDH child object and the SDH child object characteristics (step 618). After the selection or creation of the best version child object 215 (FIG. 2A), the database administrator selects or creates the SDH child object 315, as shown in FIG. 3A. For example, if the database administrator selects or creates the best version child object #2 215 (FIG. 2A), the child object wizard 504 (FIG. 5) creates or receives a selection for the SDH child object #2 315 (FIG. 3A). The child object wizard 504 (FIG. 5) provides the user interface 1000 in FIG. 10. The SDH child object 1002 can have one or more components or fields. For example, component 1004 may relate to component 804 (FIG. 8) created by the database administrator or component 904 (FIG. 9) selected by the database administrator. Similarly, field 1006 may relate to a data field 208 (FIG. 2A) in the selected or created in the child business object 215 (FIG. 2B). The child object wizard 504 (FIG. 5) can automatically create the data fields in the SDH child object 1002 and automatically associate the components and fields with those components and fields in the new child object.

The child object wizard 504 (FIG. 5) selects the SDH data structures (step 620). The SDH child object selected in select operation 618 is associated with one or more data structures, as shown in SDH data file 316 (FIG. 3B). The associated data structures may have parallel structure and relationship to the SDH child object 300 (FIG. 3A). However, in other embodiments, the SDH data file 316 (FIG. 3B) can have more or fewer data structures that are associated in various configurations to the SDH child object 300 (FIG. 3A). The child object wizard 504 (FIG. 5) provides user interface 1100, shown in FIG. 11, to the database administrator. The database administrator can create a customized SDH data file 316 (FIG. 3B) with user interface 1100. First, the database administrator may choose a SDH table 318 (FIG. 3B) by selecting a table from the drop down menu 1102. Thus, the user need not but can select a SDH table 318 (FIG. 3B) that is not normally associated with the SDH child object 300 (FIG. 3A). By selecting one or more SDH columns 320 with drop down menu 1104, the database administrator may customize the SDH table 318 (FIG. 3B). The database administrator may then create one or more fields by naming the fields in the text box 1106 and selecting the add button 1108. The added fields are displayed by the child object wizard 504 (FIG. 5) in the display box 1110. There may be standard data included in each SDH field, for example, date stamp for current data, time stamp for current data, date and time of first creation, change log, etc. The child object wizard 504 (FIG. 5) can include one or more of these items of history data in each SDH field 324 (FIG. 3B).

The child object wizard 504 (FIG. 5) selects or creates the integration object (step 622). After creating the best version child object 215 (FIG. 2A) and/or the SDH child object 315 (FIG. 3A), the child object wizard 504 (FIG. 5) can create the SDH integration object 404 (FIG. 4). The SDH integration object 404 (FIG. 4) associates the SDH child object 315 (FIG. 3A) in the MDM database 116 (FIG. 1) with a SDH child object 315 (FIG. 3A) in one or more transactional servers 108, 110, and/or 112 (FIG. 1). The child object wizard 504 (FIG. 5) can present the database administrator with user interface 1200, shown in FIG. 12, to create or select the SDH integration object 404 (FIG. 4). In embodiments, if the database administrator selects the check box 1206, the database administrator desires to create a new SDH integration object 404 (FIG. 4). The database administrator may then enter a name for the new SDH integration object 404 (FIG. 4) in text box 1208. The child object wizard 504 (FIG. 5) can receive the selection to create the new SDH integration object 404 (FIG. 4) and the name of the new SDH integration object 404 (FIG. 4). In another embodiment, the database administrator selects a pre-existing SDH integration object 404 (FIG. 4) from a drop down menu 1204.

Figure 12:
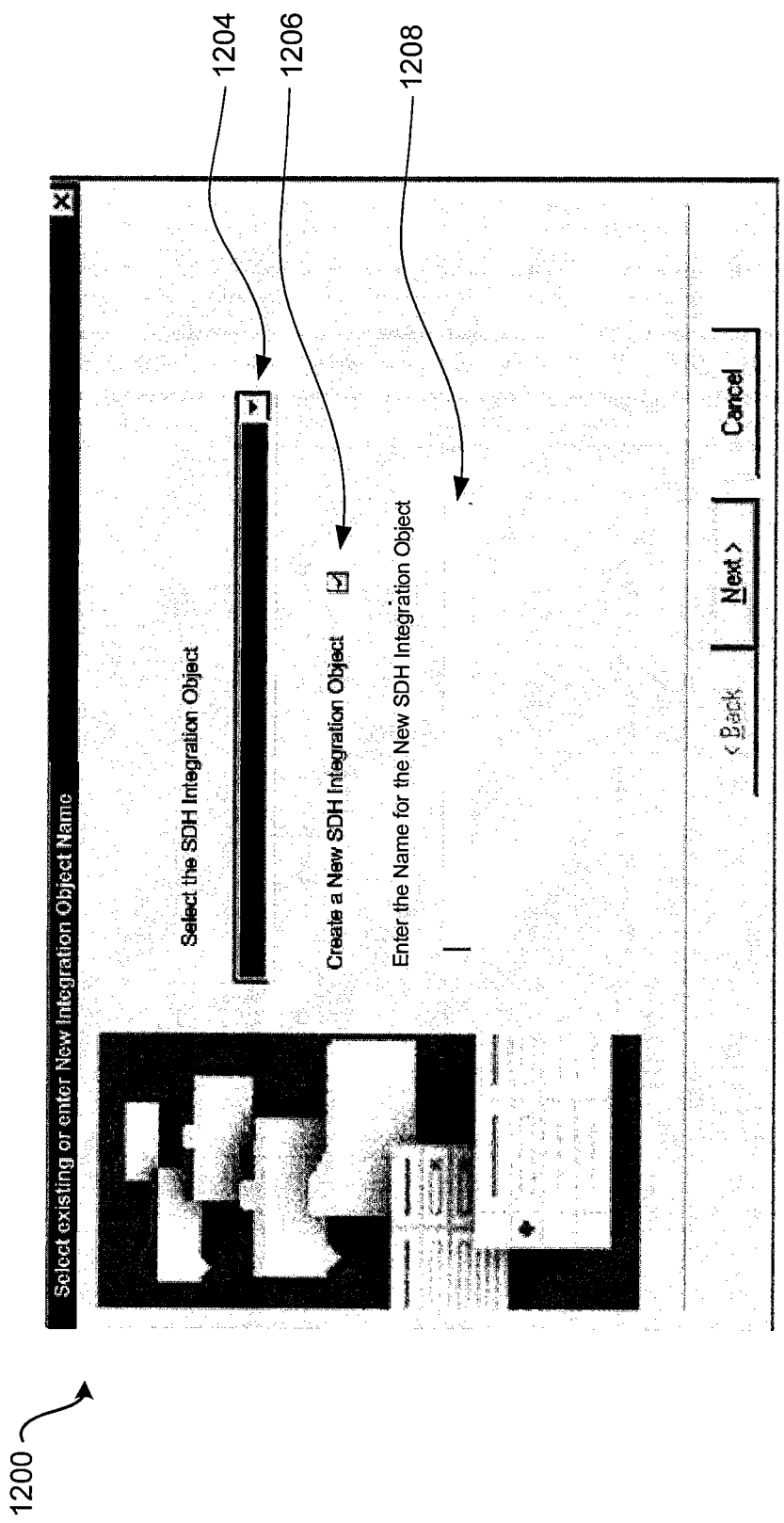
Figure 13:
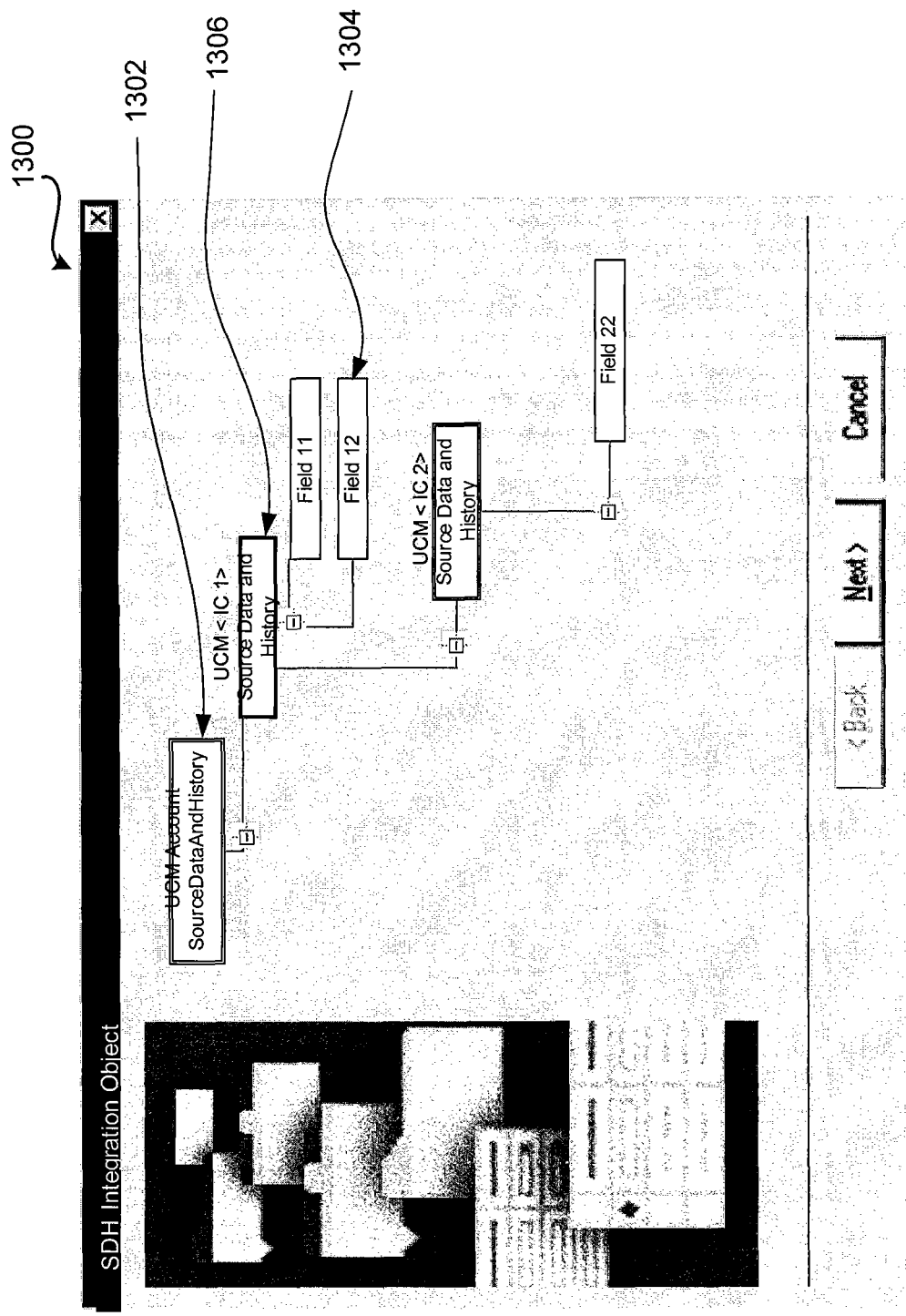
Figure 14:
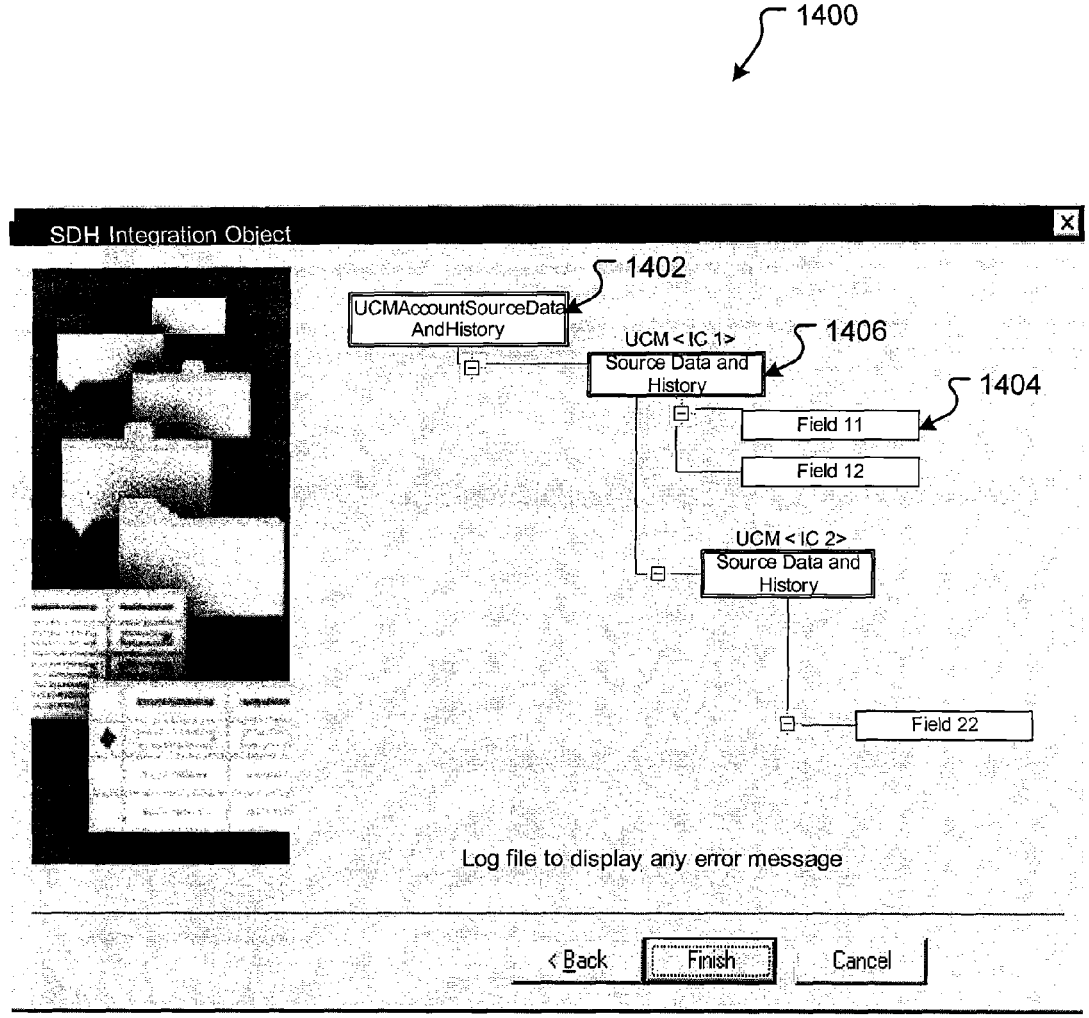

If selecting a pre-existing SDH integration object 404 (FIG. 4), the child object wizard 504 (FIG. 5) provides the database administrator with user interface 1300 shown in FIG. 13. The user interface 1300 can include a display of the components or fields in the selected SDH integration object 404 (FIG. 4). For example, the SDH integration object 404 (FIG. 4) can have a display component 1302 associated with the SDH integration child object 402 (FIG. 4). The SDH integration child object 402 (FIG. 4) can be associated with the SDH child object 315 (FIG. 3A) in the MDM database 116 (FIG. 1) or in one or more of the transactional databases 102, 104, and/or 106 (FIG. 1). The SDH integration component 1306 may relate to a SDH integration child object 406 (FIG. 4), and the field 1304 may be associated with a field of the SDH integration child object 406 (FIG. 4). The user may select one or more components or fields in the user interface 1200 (FIG. 12). In alternative embodiments, one or more components or fields in the user interface 1200 (FIG. 12) are automatically provided and are not selectable.

Figure 11:
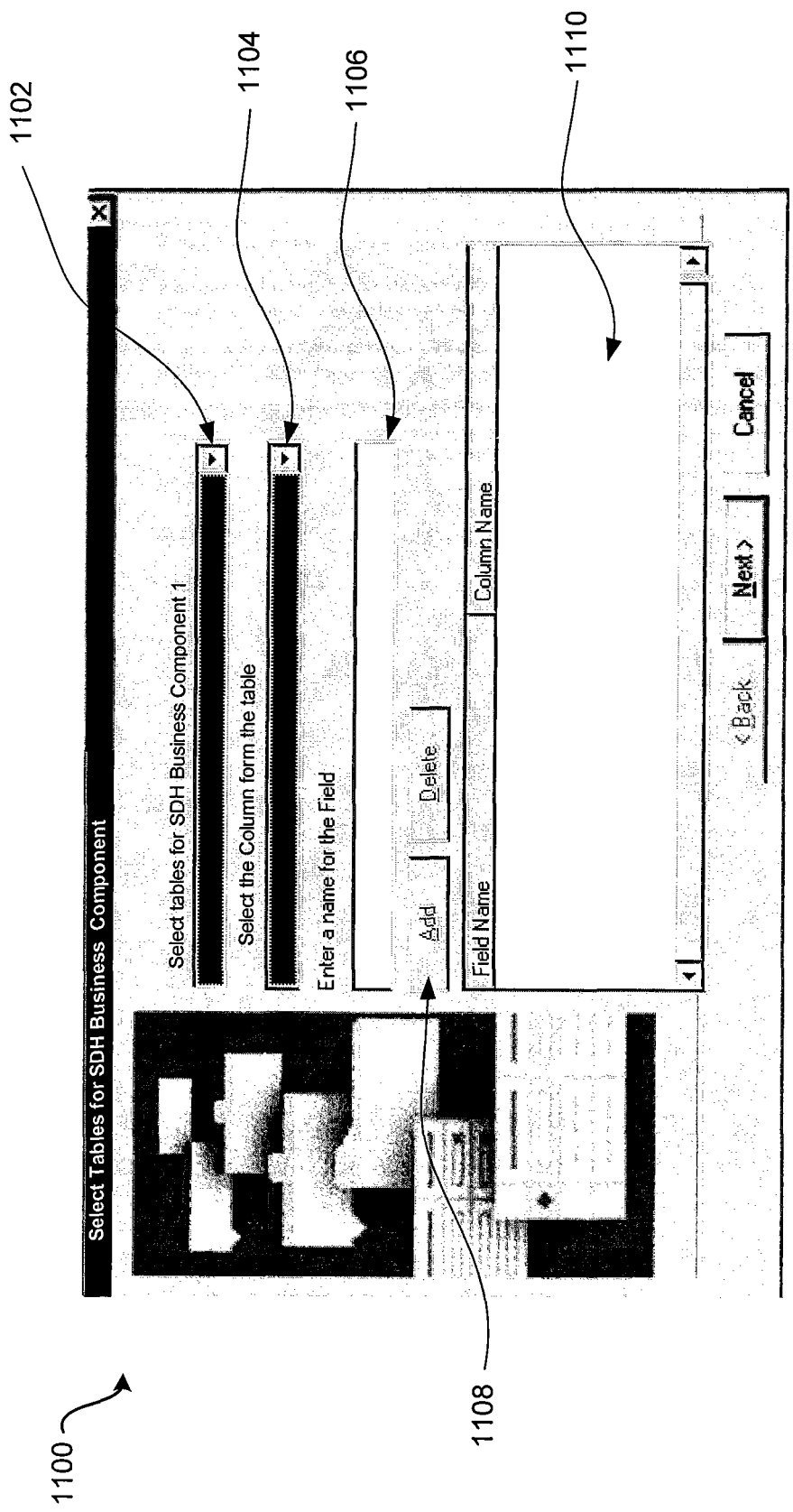

In another embodiment, if the user selects to create a new SDH integration object 404 (FIG. 4) in user interface 1100 (FIG. 11). The child object wizard 504 (FIG. 5) provides a database administrator with a user interface 1400 shown in FIG. 14. The user interface 1400 can accept the database administrator's selection of the components or fields in the selected SDH integration object 404 (FIG. 4). For example, the SDH integration object 404 (FIG. 4) can include selections for a display component 1402. The SDH integration child object 402 (FIG. 4) can be associated with the SDH child object 302 (FIG. 3A) in the MDM database 116 (FIG. 1) and/or in one or more of the transactional databases 102, 104, and/or 106 (FIG. 1). The SDH integration component 1406 may relate to a SDH integration child object 406 (FIG. 4), and the field 1404 may be associated with a field of the SDH integration child object 406 (FIG. 4). The user may create one or more components or fields in the user interface 1400. In alternative embodiments, one or more components or fields in the user interface 1400 are automatically provided and are not changed.

The object creator 506 (FIG. 5) creates the objects and data structures (step 624). The child object wizard 504 (FIG. 5) provides the inputs to the object creator 506 (FIG. 5) and/or the database engine 508 (FIG. 5). The object creator 506 (FIG. 5) generates the source code for the new child object 215 (FIG. 2A) and stores the source code in the logic layer database 512 (FIG. 5) for later instantiation. The database engine 508 (FIG. 5) may stored the one or more source files 216 (FIG. 2B) or 316 (FIG. 3B) in the database 510 (FIG. 5). The source files 216 (FIG. 2B) or 316 (FIG. 3B) may be populated by the database engine 508 (FIG. 5) after storing the source files 216 (FIG. 2B) or 316 (FIG. 3B) or after the database is instantiated.

FIG. 15 is a block diagram illustrating components of an exemplary operating environment in which various embodiments of the present disclosure may be implemented. The system 1500 can include one or more user computers, computing devices, or processing devices 1512, 1514, 1516, 1518, which can be used to operate a client, such as a dedicated application, web browser, etc. The user computers 1512, 1514, 1516, 1518 can be general purpose personal computers (including, merely by way of example, personal computers and/or laptop computers running a standard operating system), cell phones or PDAs (running mobile software and being Internet, e-mail, SMS, Blackberry, or other communication protocol enabled), and/or workstation computers running any of a variety of commercially-available UNIX or UNIX-like operating systems (including without limitation, the variety of GNU/Linux operating systems). These user computers 1512, 1514, 1516, 1518 may also have any of a variety of applications, including one or more development systems, database client and/or server applications, and Web browser applications. Alternatively, the user computers 1512, 1514, 1516, 1518 may be any other electronic device, such as a thin-client computer, Internet-enabled gaming system, and/or personal messaging device, capable of communicating via a network (e.g., the network 1510 described below) and/or displaying and navigating Web pages or other types of electronic documents. Although the exemplary system 1500 is shown with four user computers, any number of user computers may be supported.

In most embodiments, the system 1500 includes some type of network 1510. The network 1510 may be any type of network familiar to those skilled in the art that can support data communications using any of a variety of commercially-available protocols, including without limitation TCP/IP, SNA, IPX, AppleTalk™, and the like. Merely by way of example, the network 1510 can be a local area network ("LAN"), such as an Ethernet network, a Token-Ring network, and/or the like; a wide-area network ("WAN"); a virtual network, including without limitation a virtual private network ("VPN"); the Internet; an intranet; an extranet; a public switched telephone network ("PSTN"); an infra-red network; a wireless network (e.g., a network operating under any of the IEEE 802.11 suite of protocols, GRPS, GSM, UMTS, EDGE, 2G, 2.15G, 3G, 4G, Wimax, WiFi, CDMA 2000, WCDMA, the Bluetooth protocol known in the art, and/or any other wireless protocol); and/or any combination of these and/or other networks.

The system may also include one or more server computers 1502, 1504, 1506 which can be general purpose computers, specialized server computers (including, merely by way of example, PC servers, UNIX servers, mid-range servers, mainframe computers rack-mounted servers, etc.), server farms, server clusters, or any other appropriate arrangement and/or combination. One or more of the servers (e.g., 1506) may be dedicated to running applications, such as a business application, a Web server, application server, etc. Such servers maybe used to process requests from user computers 1512, 1514, 1516, 1518. The applications can also include any number of applications for controlling access to resources of the servers 1502, 1504, 1506.

The Web server can be running an operating system including any of those discussed above, as well as any commercially-available server operating systems. The Web server can also run any of a variety of server applications and/or mid-tier applications, including HTTP servers, FTP servers, CGI servers, database servers, Java servers, business applications, and the like. The server(s) also may be one or more computers which can be capable of executing programs or scripts in response to the user computers 1512, 1514, 1516, 1518. As one example, a server may execute one or more Web applications. The Web application may be implemented as one or more scripts or programs written in any programming language, such as Java®, C, C# or C++, and/or any scripting language, such as Perl, Python, or TCL, as well as combinations of any programming/scripting languages. The server(s) may also include database servers, including without limitation those commercially available from Oracle®, Microsoft®, Sybase®, IBM® and the like, which can process requests from database clients running on a user computer 1512, 1514, 1516, 1518.

The system 1500 may also include one or more databases 1520. The database(s) 1520 may reside in a variety of locations. By way of example, a database 1520 may reside on a storage medium local to (and/or resident in) one or more of the computers 1502, 1504, 1506, 1512, 1514, 1516, 1518. Alternatively, it may be remote from any or all of the computers 1502, 1504, 1506, 1512, 1514, 1516, 1518, and/or in communication (e.g., via the network 1510) with one or more of these. In a particular set of embodiments, the database 1520 may reside in a storage-area network ("SAN") familiar to those skilled in the art. Similarly, any necessary files for performing the functions attributed to the computers 1502, 1504, 1506, 1512, 1514, 1516, 1518 maybe stored locally on the respective computer and/or remotely, as appropriate. In one set of embodiments, the database 1520 may be a relational database, such as Oracle® 10 g, that is adapted to store, update, and retrieve data in response to SQL-formatted commands.

FIG. 16 illustrates an exemplary computer system 1600, in which various embodiments of the present disclosure may be implemented. The system 1600 may be used to implement any of the computer systems described above. The computer system 1600 is shown comprising hardware elements that may be electrically coupled via a bus 1624. The hardware elements may include one or more central processing units (CPUs) 1602, one or more input devices 1604 (e.g., a mouse, a keyboard, etc.), and one or more output devices 1606 (e.g., a display device, a printer, etc.). The computer system 1600 may also include one or more storage devices 1608. By way of example, the storage device(s) 1608 can include devices such as disk drives, optical storage devices, solid-state storage device such as a random access memory ("RAM") and/or a read-only memory ("ROM"), which can be programmable, flash-updateable and/or the like.

The computer system 1600 may additionally include a computer-readable storage media reader 1612, a communications system 1614 (e.g., a modem, a network card (wireless or wired), an infra-red communication device, etc.), and working memory 1618, which may include RAM and ROM devices as described above. In some embodiments, the computer system 1600 may also include a processing acceleration unit 1616, which can include a digital signal processor DSP, a special-purpose processor, and/or the like.

The computer-readable storage media reader 1612 can further be connected to a computer-readable storage medium 1610, together (and, optionally, in combination with storage device(s) 1608) comprehensively representing remote, local, fixed, and/or removable storage devices plus storage media for temporarily and/or more permanently containing, storing, transmitting, and retrieving computer-readable information. The communications system 1614 may permit data to be exchanged with the network and/or any other computer described above with respect to the system 1600.

The computer system 1600 may also comprise software elements, shown as being currently located within a working memory 1618, including an operating system 1620 and/or other code 1622, such as an application program (which may be a client application, Web browser, mid-tier application, RDBMS, etc.). It should be appreciated that alternate embodiments of a computer system 1600 may have numerous variations from that described above. For example, customized hardware might also be used and/or particular elements might be implemented in hardware, software (including portable software, such as applets), or both. Further, connection to other computing devices such as network input/output devices may be employed.

Storage media and computer-readable media for containing code, or portions of code, can include any appropriate media known or used in the art, including storage media and communication media, such as, but not limited to, volatile and non-volatile, removable and non-removable media implemented in any method or technology for storage and/or transmission of information such as computer-readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, data signals, data transmissions, or any other medium which can be used to store or transmit the desired information and which can be accessed by the computer. Based on the disclosure and teachings provided herein, a person of ordinary skill in the art will appreciate other ways and/or methods to implement the various embodiments.

Figure 17:
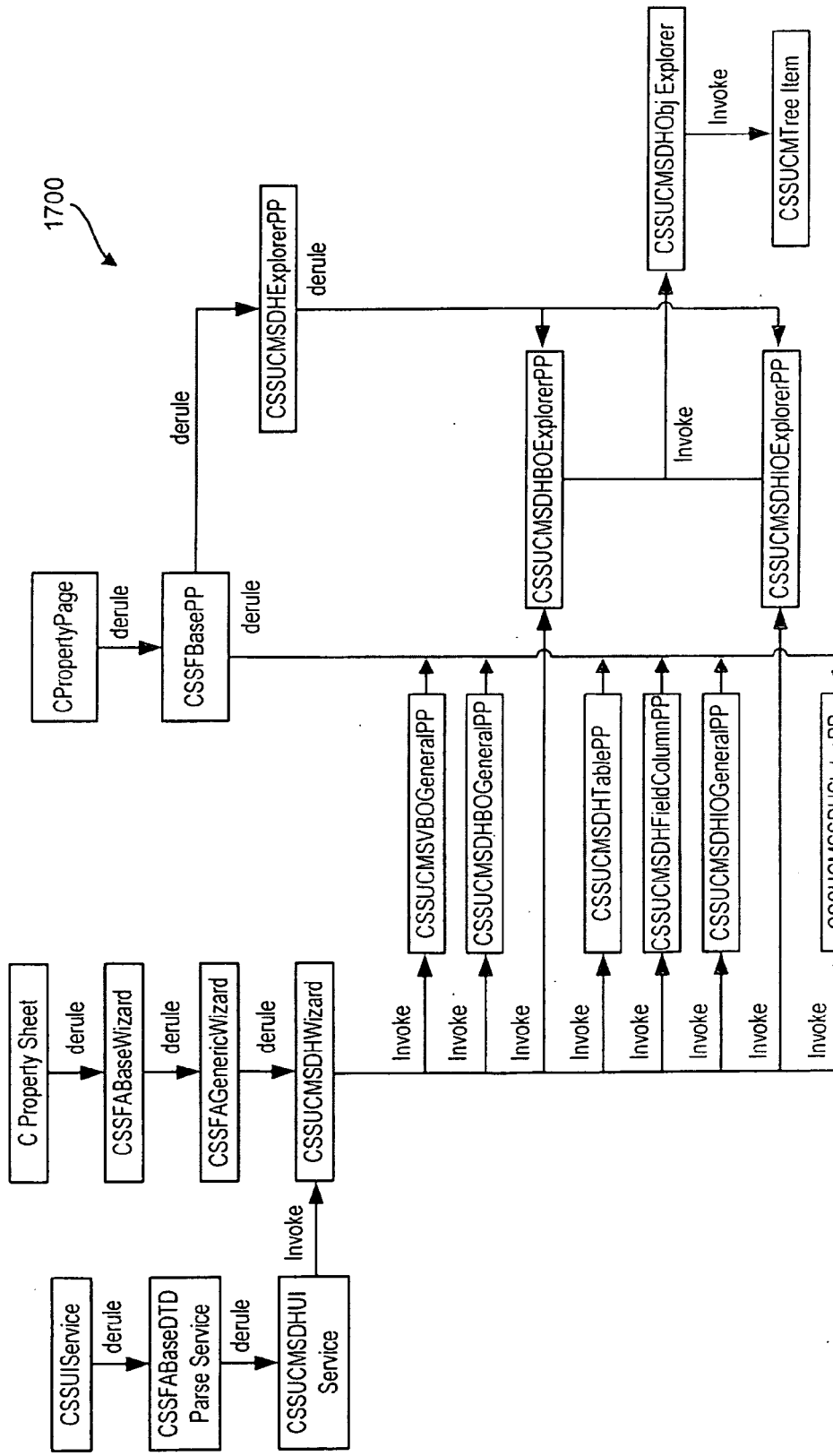
FIG. 17 is a hierarchical diagram of an embodiment of a class hierarchy representing the software for creating a new child object in an MDM database.

An exemplary class hierarchy 1700 for an embodiment of software for effectuating the child object wizard 504 (FIG. 5) is shown in FIG. 17. The class hierarchy has functionality as described in Table 1 below:

TABLE 1

Exemplary software classes

| Class | Method | Comment |
|---|---|---|
| CSSUCMSDHUIService | | |
| | OnDoStartUiWizard | Trigger the SDH Wizard to generate the objects needed Instantiate CSSUCMSDHWizard and set variables, for displaying the wizard |
| | ParseBO | Check which BCs in the best version BO are already present in SDH BO |
| | ParseIO | Check which BCs in the SDH BO are already present in SDH IO |
| | InsertBusObj | Inserts the BCs, links and BO into repository |
| | InsertIntObj | Inserts the ICs, user keys and status keys for the ICs, IO and user properties for the IO |
| CSSUCMSDHWizard | | Controls the logical flow of the pages |
| | CSSUCMSDH Wizard | Add pages to the Propertysheet |
| | ~CSSUCMSDHWizard | Destructor of class |
| | ComputeNextPage | Decide which should be the next page to be displayed |
| | SetBVBO | Set the name of best version BO in the property sheet |
| | SetSDHBO | Set the name of the SDH BO in the property sheet |
| | IsSyncBO | Returns whether the user has selected existing BO or new BO |
| | IsSyncIO | Returns whether the user has selected existing IO or new IO |
| | updateMessage | Updates the final status page with new message |
| CSSUCMBVBOGeneralPP | | |
| | MESSAGE_MAP | Associate events with handlers for UI controls |
| | DoDataExchange | Associate UI controls with member variables |
| | OnSetActive | Initialize the items in property page with the proper value. Check to see if any of the values have been already set, then make sure that they are properly displayed. |
| | OnComboSelection | Handles logic when selection is made from the combo box |
| | OnWizardNext | Wraps the logic when the user select the 'Next' button which calls the PropertySheet to tell it which page to go next |

TABLE 1-continued

Exemplary software classes

| Class | Method | Comment |
|---|---|---|
| | SetPropertySheet | Set the property sheet variable of the property page |
| | LoadBVBO | Loads the combo box with best version BOs |
| CSSUCMSDHBOGeneralPP | | Implement the page to get SDH BO name. |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnDataChanged | Handles logic when event is triggered |
| | OnWizardBack | Wraps the logic when the user select the 'Back' button which calls the PropertySheet to tell it which page to go back to |
| | OnWizardNext | Wraps the logic when the user select the 'Next' button which calls the PropertySheet to tell it which page to go next |
| | SetPropertySheet | Set the property sheet variable of the property page |
| | LoadSDHBO | Load the combo box with SDH BOs |
| CSSUCMSDHExplorerPP | | Provides the tree functionalities required for displaying BO and IO tree |
| | OnClickTree | Handler for clicks on the tree window |
| | OnKeydownTree | Handler for key presses on the keyboard |
| | OnStateChange | When the user has clicked on the state image of an item |
| | OnRefreshTreeOnce | Is called whenever the tree has to be redrawn |
| | SetObjExplorer | Sets the object explorer |
| CSSUCMSDHObjExplorer | | Provides the functionalities for creating the explorer tree |
| | CreateExplorerView | Creates the explorer tree |
| | PutItem | Adds a Component item to the tree |
| | PutFieldItem | Adds a field item to the tree |
| | GetItem | Retrieves a component item from the tree |
| | GetFieldItem | Retrieves a field item from the tree |
| | Refresh | Refresh the entire tree |
| CSSUCMTreeItem | | Abstracts three tree nodes into one tree item. (Explanation provided in next section.) |
| | CSSUCMSDHTreeItem | Constructor |
| | GetState | Returns the state of the item |
| | Refresh | Refresh the state of this item |
| | SetState | Set the state of this item |
| CSSUCMSDHBOExplorerPP | | Implement the page to display the BO explorer |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnWizardBack | Wraps the logic when the user select the 'Back' button which calls the PropertySheet to tell it which page to go back to |

TABLE 1-continued

| Exemplary software classes | | |
|---|---|---|
| Class | Method | Comment |
| | OnWizardNext | Wraps the logic when the user select the 'Next' button which calls the PropertySheet to tell it which page to go next |
| | SetPropertySheet | Set the property sheet variable of the property page |
| | PruneTree | Gets the updated BO tree structure from the tree control |
| CSSUCMSDHTablePP | | Implement the page to get SDH Table names |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnComboSelection | Handles logic when selection is made in combo box |
| | OnWizardBack | Wraps the logic when the user select the 'Back' button which calls the PropertySheet to tell it which page to go back to |
| | OnWizardNext | Wraps the logic when the user select the 'Next' button which calls the PropertySheet to tell it which page to go next |
| | SetPropertySheet | Set the property sheet variable of the property page |
| | LoadTables | Loads the combo box with all tables from the repository |
| CSSUCMSDHFieldColumnPP | | Implement the page to get SDH Field and Column mappings |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnComboSelection | Handles logic when selection is made in the combo box |
| | OnWizardBack | Wraps the logic when the user select the 'Back' button which calls the PropertySheet to tell it which page to go back to |
| | OnWizardNext | Wraps the logic when the user select the 'Next' button which calls the PropertySheet to tell it which page to go next |
| | SetPropertySheet | Set the property sheet variable of the property page |
| | OnEnter | Handle the case where the user clicks on Enter button |
| | OnDelete | Handle the case where the user clicks on Delete button |
| | LoadFields | Load the combo box with selected fields of current BC |
| | LoadColumns | Load the combo box with columns from the table for the current BC |
| CSSUCMSDHIOGeneralPP | | Implement the page to get SDH IO name |
| | DoDataExchange | Associate UI controls with member variables |
| | MESSAGE_MAP | Associate events with handlers for UI controls |
| | OnSetActive | Initialize the items in property page with the proper value. Check to see if any of the values |

TABLE 1-continued

Exemplary software classes

| Class | Method | Comment |
|---|---|---|
| | | have been already set, then make sure that they are properly displayed. |
| | OnDataChanged | Handles logic when event is triggered |
| | OnWizardBack | Wraps the logic when the user select the 'Back' button which calls the PropertySheet to tell it which page to go back to |
| | OnWizardNext | Wraps the logic when the user select the 'Next' button which calls the PropertySheet to tell it which page to go next |
| | SetPropertySheet | Set the property sheet variable of the property page |
| | LoadSDHIO | Loads the combo box with SDH IOs |
| CSSUCMSDHIOExplorerPP | | Implement the page to display the IO explorer |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnWizardBack | Wraps the logic when the user select the 'Back' button which calls the PropertySheet to tell it which page to go back to |
| | OnWizardNext | Wraps the logic when the user select the 'Next' button which calls the PropertySheet to tell it which page to go next |
| | SetPropertySheet | Set the property sheet variable of the property page |
| | PruneTree | Gets the updated BO tree structure from the tree control |
| CSSUCMSDHStatusPP | | Implement the page to display status of objects generation |
| | DoDataExchange | Associate UI controls with member variables |
| | MESSAGE_MAP | Associate events with handlers for UI controls |
| | OnSetActive | Initialize the items in property page with the proper value. Check to see if any of the values have been already set, then make sure that they are properly displayed. |
| | OnWizardFinish | Wraps the logic when the user select the 'Finish' button which calls the PropertySheet to tell it which page to go next |
| | updateMessage | Displays a message on the property page |
| | OnCreate | Starts inserting data into repository when the user clicks on Create button |

Embodiments presented herein have several advantages. Namely, the child object wizard 504 (FIG. 5) provides a graphical display to create child objects rather than force the database administrator to code the new child objects. Further, the system automatically creates the objects and source files including the linking to data history objects and integration objects. The database administrator saves time and is less apt to err when creating child objects because of the automated functionality of the child object wizard 504 (FIG. 5).

Some embodiments may have alternative functionality. For example, the database administrator may be able to copy an existing child object and modify one or more attributes of the copied child object. This copying of the child object may be useful when a slightly different task or type of data is needed. For example, if the object is for days from a certain date and the new object is used for data relating to number of hours since a certain date. Further, the child object wizard 504 (FIG. 5) and object creator 506 (FIG. 5) may be combined into a single software element. Where the child object wizard 504

(FIG. 5) creates the object and populates the object fields contemporaneously with the reception of the inputs.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

What is claimed is:

1. A method executed on a computer system for creating a child object in a data object hierarchy of a database, comprising:
    receiving at a database application of the computer system a selection from a first user interface display to create a new child object within the data object hierarchy;
    providing by the database application of the computer system a second user interface display allowing a user to input selections for the new child object;
    receiving at the database application of the computer system a selection from the second user interface display for a parent object, wherein the parent object comprises an object from which the child object will depend within the data object hierarchy;
    receiving at the database application of the computer system a selection from the second user interface display for one or more attributes of the child object;
    providing by the database application of the computer system a third user interface display allowing the user to input selection of a new source data history object associated with the new child object, wherein the new source data history object comprises metadata about a history of the data in the new child object;
    receiving at the database application of the computer system a selection from the third user interface display for one or more attributes of the new source data history object associated with the new child object;
    providing by the database application of the computer system a fourth user interface display allowing the user to input selection of a new source data history integration object associated with the new child object, wherein the new source data history integration object comprises metadata linking the data in the new child object to one or more other databases;
    receiving at the database application of the computer system a selection from the third user interface display for one or more attributes of the new source data history integration object associated with the new child object;
    automatically creating by the database application of the computer system the new child object, the new source data history object, and the new source data history integration object; and
    storing by the database application of the computer system the new child object in the data object hierarchy of the database.

2. The method as defined in claim 1, further comprising receiving at the database application of the computer system a selection from the second user interface display for one or more children objects of the new child object, wherein the one or more children objects of the new child object will depend from the new child object within the data object hierarchy.

3. The method as defined in claim 1, further comprising receiving at the database application of the computer system a selection from the second user interface display for one or more components of a source data file associated with the database.

4. The method as defined in claim 1, further comprising:
    generating by the database application of the computer system source code for the new child object; and
    storing by the database application of the computer system the source code in a logic layer database.

5. The method as defined in claim 4, further comprising:
    generating by the database application of the computer system one or more source data files associated with the source code; and
    storing by the database application of the computer system the source data files in a data layer database.

6. The method as defined in claim 5, wherein a Master Data Management (MDM) database includes the new child object.

7. The method as defined in claim 1, further comprising:
    generating by the database application of the computer system the new source data history object associated with the new child object based on the received one or more attributes for the new source data history object;
    generating by the database application of the computer system one or more source data history data files associated with the source data history object;
    generating by the database application of the computer system the new source data history integration object associated with the new child object based on the received one or more attributes for the new source data history integration object; and
    storing by the database application of the computer system the new source data history object, the one or more source data history data files, and the new source data history integration object.

8. A system comprising:
    a processor; and
    a memory coupled with and readable by the processor and having stored therein a sequence of instructions which, when executed by the processor, causes the processor to create a child object in a data object hierarchy of a database by a selection from a first user interface display to create a new child object within the data object hierarchy, providing a second user interface display allowing a user to input selections for the new child object, receiving a selection from the second user interface display for a parent object, wherein the parent object comprises an object from which the child object will depend within the data object hierarchy, receiving a selection from the second user interface display for one or more attributes of the child object, providing a third user interface display allowing the user to input selection of a new source data history object associated with the new child object, wherein the new source data history object comprises metadata about a history of the data in the new child object, receiving a selection from the third user interface display for one or more attributes of the new source data history object associated with the new child object, providing a fourth user interface display allowing the user to input selection of a new source data history integration object associated with the new child object, wherein the new source data history integration object comprises metadata linking the data in the new child object to one or more other databases, receiving a selection from the third user interface display for one or more attributes of the new source data history integration object associated with the new child object, automatically creating the new child object, the new source data history object, and the new source data history integration object, and storing the new child object in the data object hierarchy of the database.

9. The system as defined in claim 8, further comprising receiving a selection from the second user interface display for one or more children objects of the new child object, wherein the one or more children objects of the new child object will depend from the new child object within the data object hierarchy.

10. The system as defined in claim 8, further comprising receiving a selection from the second user interface display for one or more components of a source data file associated with the database.

11. The system as defined in claim 8, further comprising:
generating source code for the new child object; and
storing the source code in a logic layer database.

12. The system as defined in claim 11, further comprising:
generating one or more source data files associated with the source code; and
storing the source data files in a data layer database.

13. The system as defined in claim 12, wherein a Master Data Management (MDM) database includes the new child object.

14. The system as defined in claim 8, further comprising:
generating the new source data history object associated with the new child object based on the received one or more attributes for the new source data history object;
generating one or more source data history data files associated with the source data history object;
generating the new source data history integration object associated with the new child object based on the received one or more attributes for the new source data history integration object; and
storing the new source data history object, the one or more source data history data files, and the new source data history integration object.

15. A computer-readable memory having stored thereon a sequence of instructions which, when executed by a processor, cause the processor to create a child object in a data object hierarchy of a database by:
receiving a selection from a first user interface display to create a new child object within the data object hierarchy;
providing a second user interface display allowing a user to input selections for the new child object;
receiving a selection from the second user interface display for a parent object, wherein the parent object comprises an object from which the child object will depend within the data object hierarchy;
receiving a selection from the second user interface display for one or more attributes of the child object;
providing a third user interface display allowing the user to input selection of a new source data history object associated with the new child object, wherein the new source data history object comprises metadata about a history of the data in the new child object;
receiving a selection from the third user interface display for one or more attributes of the new source data history object associated with the new child object;
providing a fourth user interface display allowing the user to input selection of a new source data history integration object associated with the new child object, wherein the new source data history integration object comprises metadata linking the data in the new child object to one or more other databases;
receiving a selection from the third user interface display for one or more attributes of the new source data history integration object associated with the new child object;
automatically creating the new child object, the new source data history object, and the new source data history integration object; and
storing the new child object in the data object hierarchy of the database.

16. The computer-readable memory as defined in claim 15, further comprising:
the new source data history object associated with the new child object based on the received one or more attributes for the new source data history object;
generating one or more source data history data files associated with the source data history object;
generating the new source data history integration object associated with the new child object based on the received one or more attributes for the new source data history integration object; and
storing the new source data history object, the one or more source data history data files, and the new source data history integration object.

* * * * *

UNITED STATES PATENT AND TRADEMARK OFFICE
CERTIFICATE OF CORRECTION

PATENT NO.         : 8,495,104 B2                                      Page 1 of 1
APPLICATION NO.    : 12/253810
DATED              : July 23, 2013
INVENTOR(S)        : Tahiliani et al.

It is certified that error appears in the above-identified patent and that said Letters Patent is hereby corrected as shown below:

In the Specification

In column 13, line 59, delete "maybe" and insert -- may be --, therefor.

In column 14, line 29, delete "maybe" and insert -- may be --, therefor.

Signed and Sealed this
Twelfth Day of November, 2013

Teresa Stanek Rea
*Deputy Director of the United States Patent and Trademark Office*